United States Patent
Johnson et al.

(10) Patent No.: US 7,460,834 B2
(45) Date of Patent: Dec. 2, 2008

(54) METHOD AND APPARATUS FOR UTILIZING A DIRECTIONAL BEAM ANTENNA IN A WIRELESS TRANSMIT/RECEIVE UNIT

(75) Inventors: Kevin Peter Johnson, Palm Bay, FL (US); Ross L. Lintelman, Indialantic, FL (US); Michael James Lynch, Meritt Island, FL (US); Gregg Arthur Charlton, Collegeville, PA (US); Carl Wang, Flushing, NY (US); Kambiz Casey Zangi, Chapel Hill, NC (US)

(73) Assignee: InterDigital Technology Corporation, Wilmington, DE (US)

( * ) Notice: Subject to any disclaimer, the term of this patent is extended or adjusted under 35 U.S.C. 154(b) by 428 days.

(21) Appl. No.: 10/997,618

(22) Filed: Nov. 24, 2004

(65) Prior Publication Data

US 2005/0202859 A1 Sep. 15, 2005

Related U.S. Application Data

(60) Provisional application No. 60/524,579, filed on Nov. 24, 2003, provisional application No. 60/524,471, filed on Nov. 24, 2003.

(51) Int. Cl.
*H04B 1/00* (2006.01)

(52) U.S. Cl. .......... 455/63.4; 455/442; 455/452.2; 455/522; 370/332; 342/81; 342/154; 342/367; 342/368; 343/757; 343/777

(58) Field of Classification Search .......... 455/62, 455/63.4, 101, 269, 436, 442, 443, 450, 550.1, 455/562.1, 575.7, 277.1–278.1, 452.2, 522; 342/81, 154, 354, 367, 368, 147; 343/757, 343/777, 824; 370/331, 332
See application file for complete search history.

(56) References Cited

U.S. PATENT DOCUMENTS

| 5,303,240 | A | | 4/1994 | Borras et al. |
| 5,617,102 | A | | 4/1997 | Prater |
| 5,966,384 | A | * | 10/1999 | Felix et al. .......... 370/465 |
| 6,011,970 | A | | 1/2000 | McCarthy |
| 6,229,486 | B1 | * | 5/2001 | Krile .......... 343/700 MS |
| 6,304,215 | B1 | * | 10/2001 | Proctor et al. .......... 342/372 |
| 6,370,369 | B1 | * | 4/2002 | Kraiem et al. .......... 455/277.1 |
| 6,404,386 | B1 | * | 6/2002 | Proctor et al. .......... 342/368 |

(Continued)

FOREIGN PATENT DOCUMENTS

| EP | 1 069 706 | 1/2001 |
| EP | 1096706 | 1/2001 |
| EP | 1838057 | 7/2005 |

*Primary Examiner*—Dwayne D. Bost
*Assistant Examiner*—James D Ewart
(74) *Attorney, Agent, or Firm*—Volpe and Koenig, P.C.

(57) ABSTRACT

A method and apparatus for utilizing a switched beam directional antenna in a wireless transmit/receive unit (WTRU) is disclosed. A wireless communication system includes a serving cell, a neighbor cell and a WTRU. The WTRU is configured to generate and steer a directional beam in a plurality of directions. Once the WTRU registers with the wireless communication system, the WTRU receives messages transmitted by the serving cell. The WTRU measures signal quality of messages received in each of a plurality of predetermined directions while steering the directional beam antenna. The WTRU selects a particular one of the directions having the best signal quality. As the WTRU constantly moves, the WTRU monitors signal quality in the selected direction, and switches to another direction when the signal quality in a current direction drops below a predetermined threshold.

29 Claims, 9 Drawing Sheets

U.S. PATENT DOCUMENTS

| | | | |
|---|---|---|---|
| 6,456,257 B1 * | 9/2002 | Zamat | 343/876 |
| 6,456,604 B1 * | 9/2002 | Lee et al. | 370/328 |
| 6,490,454 B1 | 12/2002 | Kangas et al. | |
| 6,515,635 B2 * | 2/2003 | Chiang et al. | 343/834 |
| 6,526,286 B2 * | 2/2003 | Wan | 455/515 |
| 6,600,456 B2 * | 7/2003 | Gothard et al. | 343/834 |
| 6,697,610 B1 * | 2/2004 | Tait | 455/277.1 |
| 6,697,642 B1 * | 2/2004 | Thomas | 455/562.1 |
| 6,725,062 B1 * | 4/2004 | Paranchych | 455/561 |
| 6,771,622 B1 * | 8/2004 | Banerjee | 370/331 |
| 6,834,190 B1 * | 12/2004 | Lee et al. | 455/436 |
| 7,065,373 B2 * | 6/2006 | Rodgers et al. | 455/502 |
| 7,096,021 B1 * | 8/2006 | Lehtinen et al. | 455/442 |
| 2001/0024431 A1 * | 9/2001 | Koo et al. | 370/335 |
| 2002/0024468 A1 | 2/2002 | Palmer et al. | |
| 2002/0071403 A1 * | 6/2002 | Crowe et al. | 370/331 |
| 2002/0137538 A1 * | 9/2002 | Chen et al. | 455/550 |
| 2003/0039222 A1 * | 2/2003 | Bae et al. | 370/320 |
| 2003/0058828 A1 | 3/2003 | Sarkar et al. | |
| 2003/0114172 A1 * | 6/2003 | Soliman | 455/456 |
| 2003/0171131 A1 | 9/2003 | Kettering et al. | |
| 2003/0222818 A1 * | 12/2003 | Regnier et al. | 342/383 |
| 2003/0228857 A1 * | 12/2003 | Maeki | 455/278.1 |
| 2004/0029534 A1 * | 2/2004 | Odenwalder | 455/67.11 |
| 2004/0116110 A1 * | 6/2004 | Amerga et al. | 455/422.1 |
| 2004/0127220 A1 * | 7/2004 | Proctor, Jr. | 455/442 |
| 2005/0032542 A1 * | 2/2005 | Wilborn et al. | 455/525 |

* cited by examiner

METHOD AND APPARATUS FOR UTILIZING A DIRECTIONAL BEAM ANTENNA IN A WIRELESS TRANSMIT/RECEIVE UNIT

CROSS REFERENCE TO RELATED APPLICATIONS

This application claims the benefit of U.S. Provisional Application Nos. 60/524,579 filed Nov. 24, 2003, and 60/524,471 filed Nov. 24, 2003, which are incorporated by reference as if fully set forth.

FIELD OF INVENTION

The present invention is related to a wireless communication system. More particularly, the present invention is a method and apparatus for utilizing a switched beam directional antenna in a wireless transmit/receive unit (WTRU) operating in a cellular network. The present invention is applicable to any wireless communication system including, but not limited to, Global System For Mobile Communications (GSM), General Packet Radio System (GPRS), and Enhanced Data Rates For GSM Evolution (EDGE).

BACKGROUND

One of the most important areas in cellular technology development is the exploration of ways to improve the capacity of the system. Spectral efficiency and power consumption in mobile systems are forcing wireless communications designers to explore new areas in the technology that will offer capacity relief. One of these new areas being explored is the use of directional beam antennas to improve the link margin of the forward and reverse links between a base station and a WTRU. The increased gain of the directional antenna over the typical omni-directional antenna provides increased received signal level at the WTRU receiver allowing the base station to transmit at a lower power level. This allows more users to be simultaneously active, (i.e., more capacity), and lowers the interference seen by WTRUs in adjacent cells.

Directivity of the antenna in a WTRU can also provide a reduction in the interference level from signals received from adjacent base stations. The reverse link from the WTRU to the base station enjoys the same link margin improvement, thereby allowing the WTRU to transmit at lower power level. This reduces the interference seen at base stations of adjacent cells and can lengthen the battery life at the WTRU.

The use of a directional antenna at a WTRU requires decisive reference to the signal level measurements on each of the directional beams in order to select the best directional mode of the antenna. In a mobile communication network, the WTRU must continually monitor the received signal level in each of the directional modes and periodically reselect the best directional mode to accommodate environment changes and movement of the WTRU. In a GSM network where a TDMA scheme is employed to accommodate multiple users, inactive timeslots, (i.e., where the WTRU is not required to transmit or receive), can be used to make these measurements. However, the signal level received at the WTRU constantly changes due to multi-path propagation. Thus, measuring a higher received signal level in one direction versus another at a given time may not result in the best directional beam selection.

SUMMARY

The present invention is a method and apparatus for steering a switched beam directional antenna employed at a WTRU operating in a wireless system, including, but not limited to, GSM/GPRS/EDGE type cellular systems. The WTRU measures the received signal from the serving base station in each of the directional modes of the switched beam antenna and selects the direction having the best signal. The measurements are made during inactive timeslots where the WTRU is not required to transmit or receive. Typically, the WTRU is assigned one timeslot to transmit and one timeslot to receive of the eight TDMA slots available in the GSM system, leaving six inactive timeslots.

The signal measurement in each directional mode can be formed from the total received signal power averaged over the timeslot, (hereafter called the received signal strength indication or RSSI), received on the BCCH from the serving base station. It can also be formed from an average over a portion of the timeslot. This allows multiple beams to be measured within the same timeslot, thereby reducing the time required to develop a beam selection decision.

Alternatively, the signal quality or carrier-to-interference ratio (CIR) of the signal received from different directional modes of the antenna may be measured using the midamble of the GSM burst waveform. This technique would be applicable when measuring traffic channel slots that can also contain interference from adjacent base stations. The midamble contains a known data sequence used to discriminate between the desired signal, (i.e., the serving base station), and interfering signals received from other base stations.

In general, the beam selection decision does not rely on a single set of measurements because of signal level fluctuations due to multi-path fading. Averaging the measurements from each direction prior to selecting the best direction is an effective technique. Alternately, when measuring several beams within the same timeslot, the signal level differences seen timeslot-by-timeslot can be used to form the beam selection decision.

When performing received power measurements of neighbor cells for handoff decisions, the WTRU would be restricted to the omni-directional antenna. This provides consistent relative signal strength measurements of neighboring cells that may appear at different angles of arrival. However, if the WTRU has spare processing power to collect multi-beam measurements on neighbor cells, handoff to a directional beam may be considered.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 1:
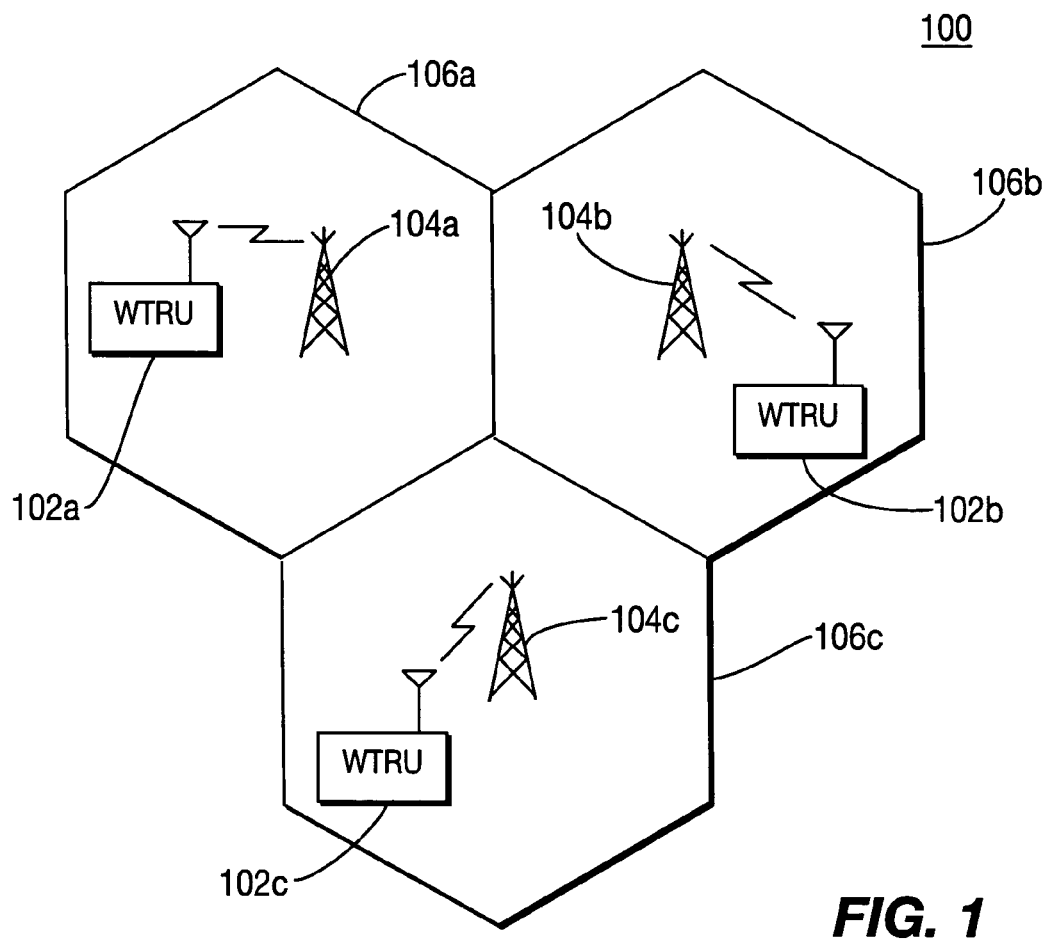
FIG. 1 is a diagram of a wireless communication system operating in accordance with the present invention.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "base station" includes but is not limited to a Node-B, a site controller, an access point, or any other type of interfacing device in a wireless environment.

The features of the present invention may be incorporated into an integrated circuit (IC) or be configured in a circuit comprising a multitude of interconnecting components.

The steering algorithm in accordance with the present invention provides an approach for steering a directional antenna (Subscriber Based Smart Antenna—SBSA) in a GSM/GPRS/EDGE handset for communicating with the network. This approach can be accomplished within the current GSM/GPRS/EDGE standards and deployed in existing networks, although the present invention is not limited to those standards.

The present invention comes into operation after a handset has registered with the network and is using a specific serving cell ARFCN (Absolute Radio Frequency Channel Number). The omni-directional mode of the antenna would be typically used prior to registration, although this is not required. The technique for steering the antenna may be performed while the handset is in an idle mode or during an active call/data transfer. During an antenna scan, the steering algorithm cycles through the antenna positions and uses an inactive timeslot to monitor signal strength of the serving cell broadcast common control channel (BCCH), since it is always active and is transmitted at a constant power. The antenna position is selected based on the strongest signal level monitored.

Steering the antenna requires periodic measurements of the available directional modes to maintain the best pointing direction when the WTRU is moving. These signal strength measurements are preferably performed during "inactive" timeslots where the WTRU is not required to demodulate data. This eliminates any loss of data due to mis-pointing the antenna. Further, the antenna measurements are performed in timeslots where the serving cell is known to be transmitting.

The signal strength of two antenna modes can be measured during the midamble of the GSM timeslot. The first half of the midamble containing a known data sequence would be received in one directional mode and the second half of the midamble would be received in another directional mode. A comparison of these two signal strength measurements serves to determine which mode is providing a better signal level. On a spare BCCH time slot, signal strength measurement of some number of antenna modes can be performed, limited by the transition requirements of the measurement and antenna switching unit(s).

When performing received power measurements of neighbor cells for handoff decisions, the WTRU may be restricted to the omni-directional antenna. This provides consistent relative signal strength measurements of neighboring cells that may appear at different angles of arrival.

FIG. 1 is a diagram of a wireless communication system 100 operating in accordance with the present invention. The wireless communication system 100 includes a plurality of WTRUs $102_{a-c}$ and base stations $104_{a-c}$. A coverage region of the wireless communication system 100 is divided into a plurality of cells $106_{a-c}$. Each cell $106_{a-c}$ is covered by a respective base station $104_{a-c}$. A WTRU $102_{a-c}$ transmits messages to, and receives messages from, a base station $104_{a-c}$ in a respective serving cell $106_{a-c}$.

The WTRU $102_{a-c}$ is configured to generate a narrow directional beam which radiates signals only in a particular direction, and preferably may also generate an omni-directional beam which radiates signals in all directions at the same power level. The WTRU $102_{a-c}$ preferably uses an omni-directional beam before the WTRU $102_{a-c}$ is registered with a wireless communication network. However, the WTRU $102_{a-c}$ may also use a directional beam before registration. Upon registration, the WTRU $102_{a-c}$ is assigned a channel to be used for communication with the base station $104_{a-c}$.

In accordance with the present invention, each WTRU $102_{a-c}$ uses a directional beam for the transmission and receipt of signals to and from the serving base station $104_{a-c}$ within the respective cell $106_{a-c}$. As the WTRU $102_{a-c}$ moves, the WTRU $102_{a-c}$ needs to constantly adjust the direction of the directional beam. The WTRU $102_{a-c}$ is configured to switch the direction of the directional beam among a plurality of positions in order to maintain the best signal quality from the serving cell $106_{a-c}$. In order to maintain the best direction for radiating signals, the WTRU $102_{a-c}$ must perform periodic measurements of the signal quality in each position of the beam pattern.

Figures 2, 4:
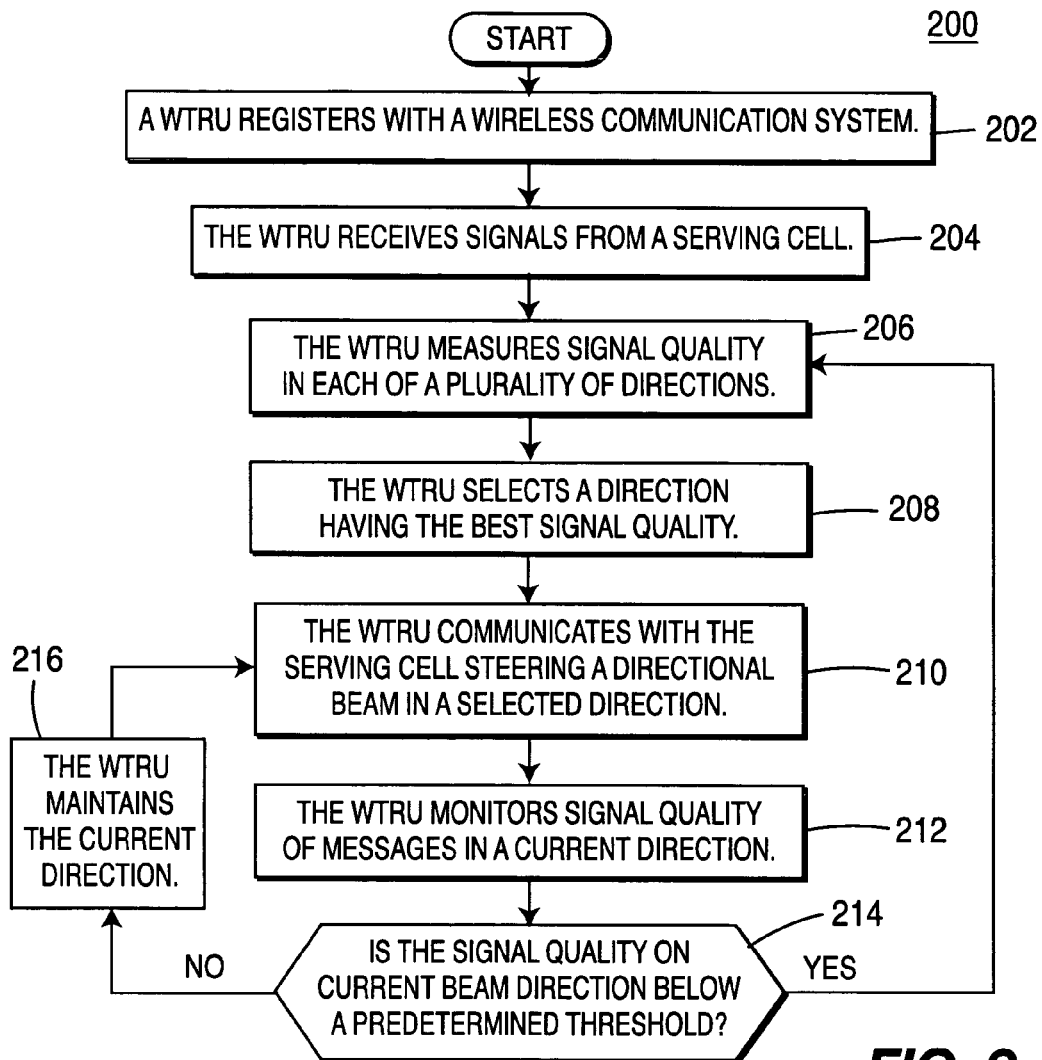
FIG. 2 is a flow diagram of a process for utilizing a directional beam antenna in a WTRU of the system of FIG. 1.
FIG. 4 is a block diagram of a WTRU configured to utilize a directional beam antenna in the system of FIG. 1.

FIG. 2 is a flow diagram including method steps of a process 200 for utilizing a directional beam antenna in a WTRU, for example WTRU $102_a$. In step 202, the WTRU $102_a$ registers with the wireless communication system 100. In order to perform physical measurements, the WTRU $102_a$ preferably receives and processes messages transmitted from a base station $104_a$ in a serving cell $106_a$ via a pilot channel or a broadcast channel, such as broadcast common control channel (BCCH) (step 204). The messages transmitted via the pilot channel or broadcast channel are always available and are transmitted at a known transmission power level. Therefore, the WTRU $102_a$ utilizes the messages to measure signal quality in each of a plurality of directions (step 206).

In step 208, the WTRU $102_a$ selects a beam from the direction having the best signal quality. In selecting the best directional beam, the WTRU may base its decision on the average or differences of some number of signal quality measurements made for each directional beams. In step 210, the WTRU $102_a$ communicates with the serving cell $106_a$ steering a directional beam in the selected direction. Since it is assumed that the WTRU $102_a$ constantly moves, the beam direction is constantly adjusted to maintain the best direction.

In step 212, the WTRU $102_a$ periodically monitors the signal quality of the messages received from a pilot channel, a broadcast channel, or a traffic channel in the current beam direction. The frequency of measurements should be high enough to accommodate the movement of the WTRU $102_a$.

The WTRU $102_a$ may monitor signal quality only in an idle time slot in order to save processing power. If, as determined in step 214, the signal quality on the current beam direction drops below a predetermined threshold, the process 200 returns to step 206 to perform the measurements again in all other directions, in turn, and selects and switches to the beam direction having the best quality. If the signal quality on the current beam direction does not fall below the predetermined threshold, the WTRU 102 maintains the current beam direction (step 216) and continues to monitor the quality of the current beam direction, and the process returns to step 210. The threshold can be a predetermined signal quality, signal strength, or time period. The signal quality is preferably measured using a received signal strength indicator (RSSI) or a carrier-to-interference ratio (CIR). It should be noted that other parameters may be utilized alternatively or in combination to measure signal quality. Alternatively, the WTRU may rescan the antenna modes periodically instead of rescanning in accordance with the result of comparison with the threshold. A threshold scheme is more useful in a WLAN application where a multipath environment is more stationary.

Figure 3:
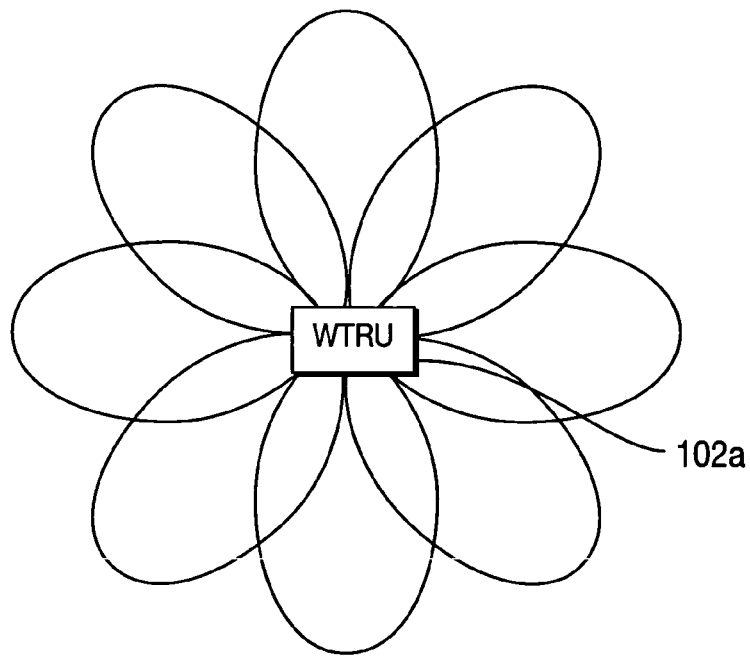
FIG. 3 is an exemplary directional beam pattern generated by the WTRU of the system of FIG. 1.

FIG. 3 shows an example of a directional beam pattern generated by the WTRU $102_a$. In this example, the WTRU $102_a$ establishes the beam pattern by switching the beam direction among eight predetermined positions and performs physical measurements in each of the eight positions or directions. Of course, those with skill in the art would realize that although there are eight pre-determined positions shown in FIG. 3, greater or fewer positions may be utilized.

FIG. 4 is a block diagram of a WTRU, for example WTRU $102_a$. The WTRU $102_a$ includes a switched beam directional antenna 402, a receiver/transmitter 404, a beam steering unit 406, a baseband processor 408, and a controller 410.

A received signal is fed from the receiver/transmitter 404 into the baseband processor 408 and the controller 410. The baseband processor 408 measures the signal quality of the received signal.

The beam direction is switched among a plurality of predetermined positions, in turn, and in each direction, the signal quality is measured. The controller 410 compares the measurement results and selects a direction having the highest signal quality. It should be noted that the measurements need not be made on different positions in a particular order, (e.g., such as clockwise or counter-clockwise). For example, the measurements may begin in the direction of the previous "best signal" and then the two positions on either side of the position having the previous best signal may be selected for measurement, and so on. A random scheme may also be applied.

A communication between the WTRU $102_a$ and the serving cell $106_a$ is performed after steering an antenna to the selected direction. During the communication, the controller 410 constantly monitors the signal quality on the current beam direction, and determines whether the signal quality has dropped below a predetermined threshold.

The signal quality of two directions may be measured and compared using a midamble. The first half of the midamble containing a known data sequence is received in one direction and the second half of the midamble is received in another direction. Signal quality is then compared in the two directions, and the comparison determines which direction provides a better signal quality.

A WTRU $102_a$ may also be configured to generate an omni-directional beam. The WTRU $102_a$ may utilize the omni-directional beam at the initial registration with the network and for handover between cells. For handover, the WTRU $102_a$ has to measure signal quality of neighbor cells. An omni-directional beam provides consistent relative signal strength measurements of neighboring cells that may appear at different angles of arrival.

Since each cell transmits on a different RF channel, (i.e., a different frequency), prior to measuring the quality of any channel, the WTRU must tune its receive frequency to the carrier frequency used by this cell. It takes about 250 microseconds to tune to each new carrier frequency, while measuring the channel quality itself takes perhaps 25 microseconds. Hence, the time required to tune the receive carrier frequency is a substantial part of the total time needed to measure the quality of each channel.

Figure 5:
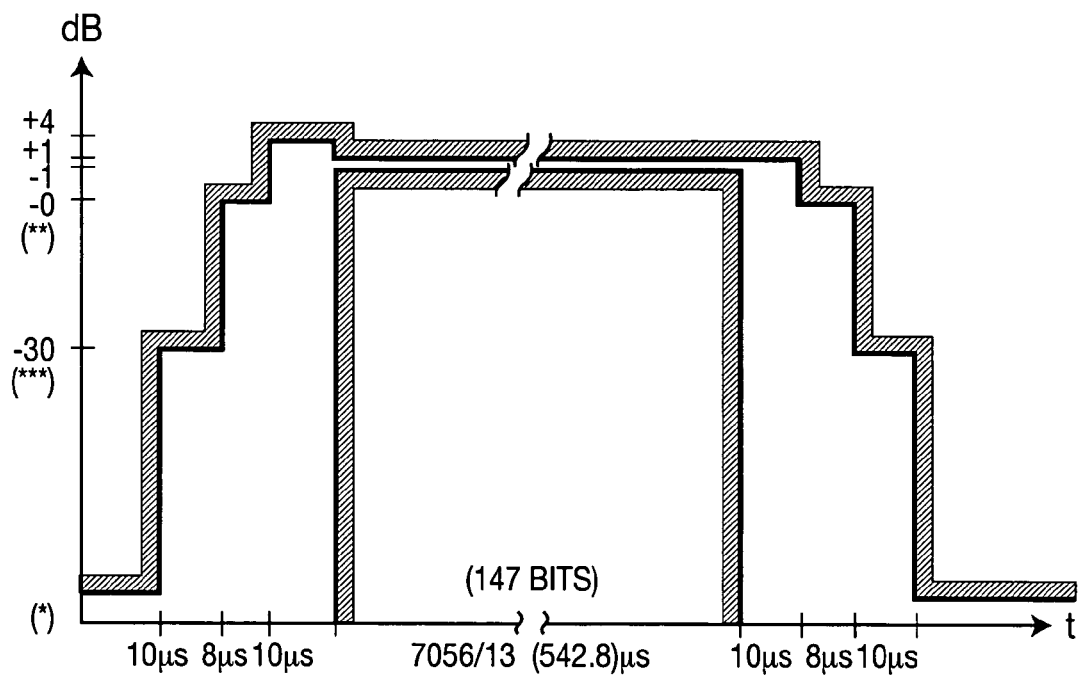
FIGS. 5 and 6 are time masks for normal duration bursts at GMSK modulation and 8-PSK modulation, respectively.
Figure 6:
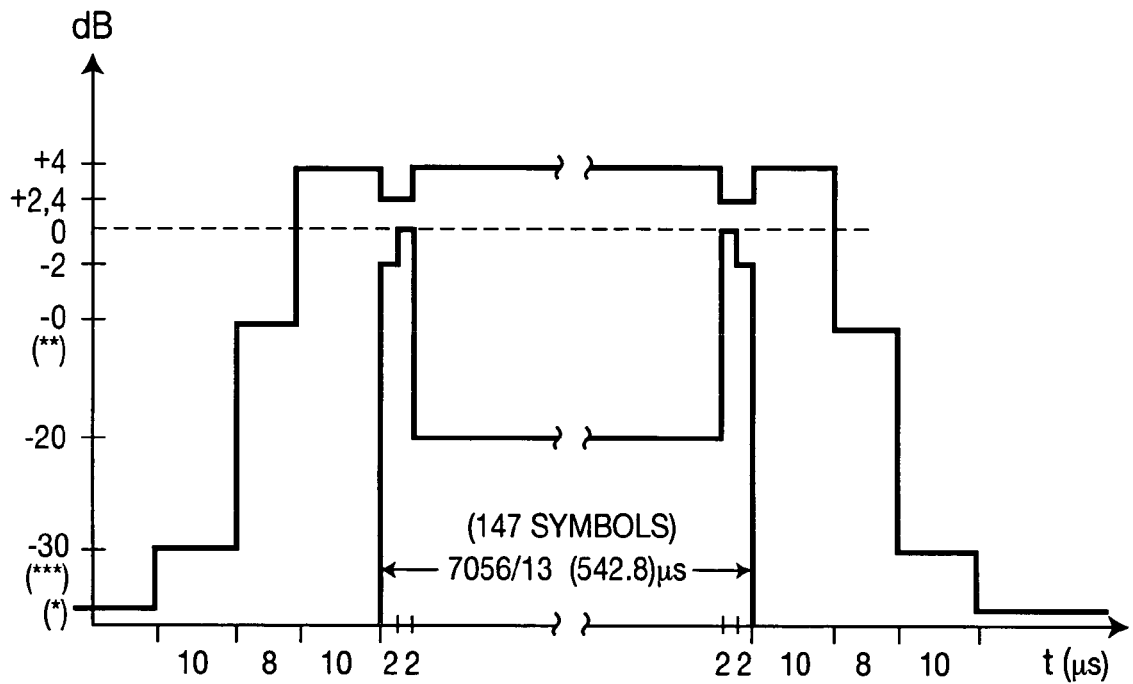

As shown in FIGS. 5 and 6, the GSM/GPRS/EDGE system applies a constant power (commanded power) time mask for a fixed 542.8 μs (useful part) of a burst transmission in the TDMA frame. In accordance with the present invention, the receiver signal measurements are averaged over a fixed period after the transient part of the curve as shown in FIG. 7.

The SBSA measurements for each beam are to be performed preferably only in the useful part of the burst transmission time period. The 542.8 μs period is divided into a plurality of parts for measurements. For example, if three beams, (a right beam, a left beam and an omni-directional beam), are used, the 542.8 μs period in one time slot is divided into three parts for measurement as shown in FIG. 7. During each phase there are two stages. The first stage is the hardware preparation for measurement, followed by the actual measurement window as shown in FIG. 7 except for the last part where last 4-bits (nu) are not taken into average to avoid a possible 10% transient as in FIG. 6.

In the foregoing example of FIG. 7, assuming that it takes 150 μs for measurement preparation, each beam measurement is averaged over 23.5 μs (6.4 bits) as shown in calculation below.

Figures 7, 8:
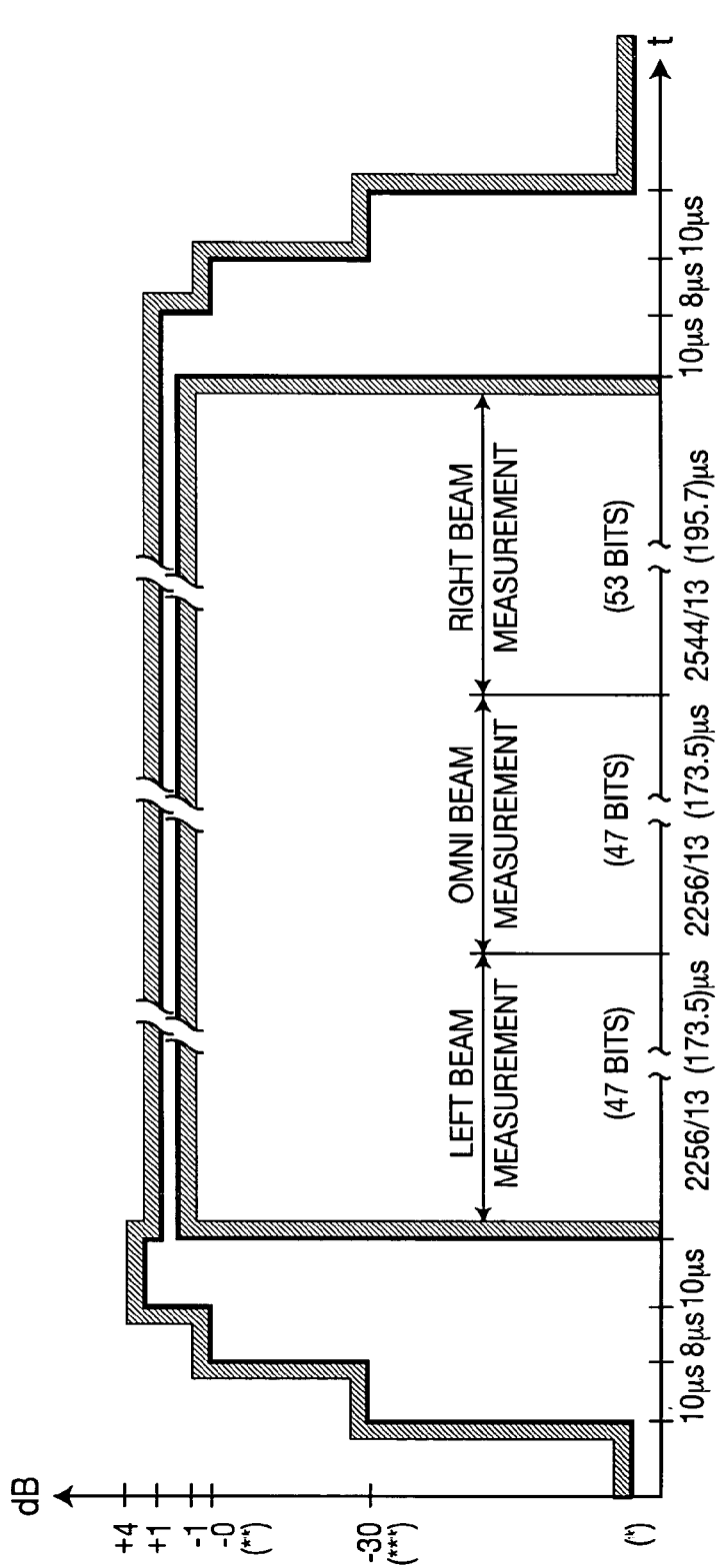
FIG. 7 is an example of three measurement intervals within a single timeslot in accordance with the present invention.
FIG. 8 is a diagram of GMSK normal burst bit structure.

Left beam average period=(173.5−150)*13/48=6.4 bits, i.e., (e40~e46, see FIG. 8).

Omni-directional beam average period=(173.5−150)*13/48=6.4 bits, i.e., (e58+e64).

Right beam average period=(195.7−150−577*10%+34.2) *13/48=6 bits, i.e., (e105~e110).

Alternatively, individual SBSA beams can also be measured on a per time slot basis. In this way, the SBSA beam measurement shall be scheduled alternately on consecutive radio frames of the measured channel. This prolongs the SBSA beam selection period and reduces the response time to environment change by threefold in the foregoing example.

An SBSA-equipped WTRU operating within the communication network must perform channel quality measurements for selection of the active beam, and the WTRU must also perform all the functions normally performed by a prior art GSM/GPRS/EDGE mobile unit. The present invention provides a method for channel quality measurements for SBSA such that the interference with the normal functions of the GSM/GPRS/EDGE WTRU is minimized.

Hereafter, the present invention will be explained with reference to an example WTRU configured to generate three beams; a right beam, a left beam, and an omni-directional beam. However, it should be noted that this is provided only as an example. The WTRU may generate any number of beams and the teachings of the present invention shall not be construed to be limited to any particular number of beams.

Abbreviations used in the following descriptions are as follows:

1) Neighbor Carriers (NC)—This is a list of the BCCH carriers of the neighboring cells that the WTRU obtains from reading the BCCH channel of its serving cell. It is assumed that there are N carriers in this list denoted by: NC={f1, f2, . . . , fN}.

2) Ordered Neighbor Carriers (ONC)—This list is constructed by ordering the elements in NC list according to the signal level (i.e., carrier power) of each neighboring carrier measured on the omni-directional beam. This list has N members, and will be denoted by ONC list.

3) Neighbor Carriers/Beams (NCB)—Each member of this list is a unique combination of one of the carriers in the neighbor list and an SBSA beam (left, right, or omni-directional). This list has 3N elements and is denoted by: NCB={f1O, f1L, f1R, f2O, f2L, f2R . . . , fNO, fNL, fNR}.

4) Ordered Neighbor Carriers/Beams (ONCB)—This list is constructed by ordering the elements in the NCB list according to the signal level of each carrier/beam pair. This list has 3N elements and is denoted by ONCB. For example, the second element of ONCB is the neighbor cell/beam with the second highest signal level.

5) Serving Carrier/Beams (SCB)—Each member of this cell is a unique combination of the BCCH carrier of the serving cell and an SBSA beam (left, right, or onmi-directional). This set has three elements and is denoted by: SCB={f0O, f0L, f0R}.

6) Time T1—The decrementing timer T1 is used to avoid a ping-pong effect in switching the active beam. Each time the active beam is switched, this timer is initialized to T1_MAX. After the active beam is switched, it takes T1_MAX seconds before the timer T1 gets to zero. The active beam can only be changed when T1 is zero.

Figure 9:
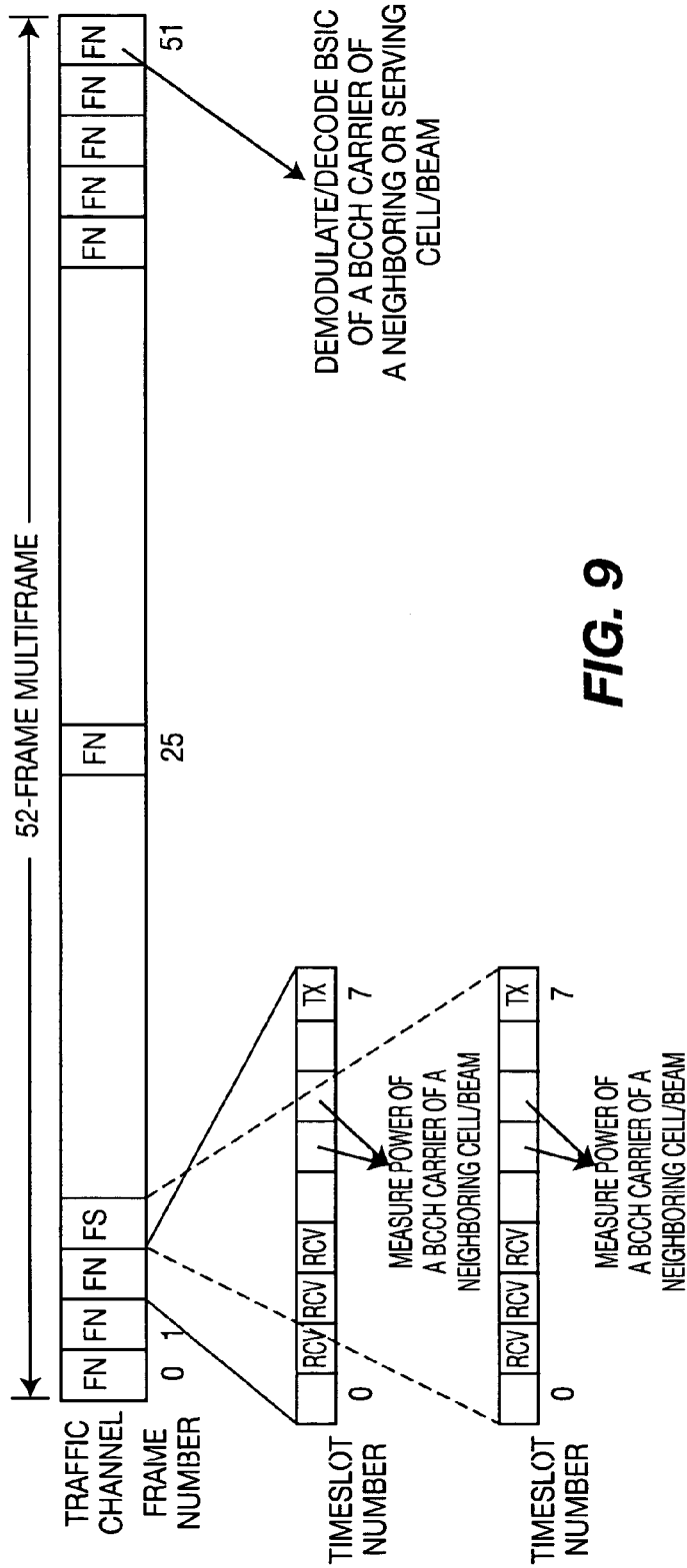
FIG. 9 is a GSM multi-frame with occurrences of neighbor cell measurements (FN) and serving cell measurements (FS), wherein each frame type is exploded to detail the activities in the eight timeslots of the frame.
Figure 10:
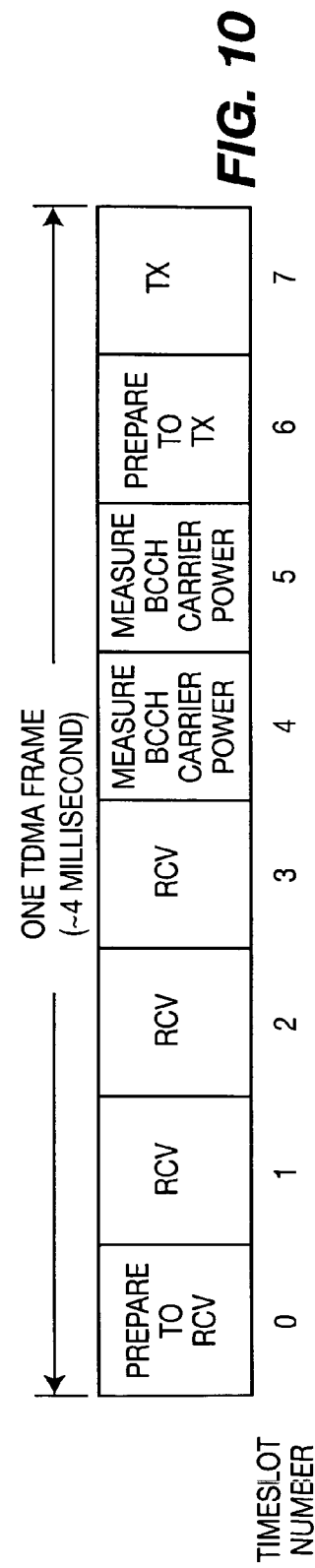
FIG. 10 is a TDMA time frame.

7) Subsets of frames in the slow associated control channel (SACCH) block (104 frames)—The measurement procedures repeat at the start of each SACCH block. Each SACCH block consists of 104 consecutive TDMA frames as shown in FIG. 9 (only 52 frames are shown in FIG. 9 since the other 52 frames are same). Measurement procedures repeat every 104 frames. Four of these 104 frames must be devoted to decoding base station identity codes (BSICs). Therefore, 100 frames are available for measuring signal level of various BCCH carriers/beams. The 104 frames are divided into three subsets (FB, FS, and FN) as shown in FIG. 9, and one TDMA frame structure is depicted in FIG. 10.

The FB subset is the set of four TDMA frames devoted to decoding BSICs. Typically, the WTRU attempts to decode the BSIC of six strongest carriers in the neighbor list (in a round robin fashion).

The FS subset is a subset of the 100 TDMA frames during which the WTRU measures the signal level on the BCCH carrier of the serving cell.

The FN subset is the subset of the 100 TDMA frames during which the WTRU measures the signal level on the BCCH carrier of the neighbor cells.

The combined total number of elements in FS and FN is always 100. However, the exact number of elements in FS and FN is a design parameter. Making the FS list larger results in more frequent measurements of the BCCH of the serving cell. Making the FS subset smaller results in more frequent measurements of the BCCH of the neighbor cells. R denotes the ratio of the size of FS divided by the size of FN.

The enumeration ranges from 1 to LISTSIZE, where LISTSIZE is the number of the elements in the foregoing lists. For each list, this enumeration is a one-to-one mapping between {1, . . . , LISTSIZE} and the members of the list. For each list, the index can take values from 1 to LISTSIZE. Each embodiment defines the actions the WTRU should take during each of these 104 frames.

In a first embodiment for active beam selection, the SBSA procedure repeats every SACCH block (104 TDMA frames). The WTRU measures signal strength on all three beams both for the serving cell and for the neighbor cells, and the WTRU is required to decode the BSIC on the new candidate active beam on the BCCH of the serving cell before the active beam is changed. Since the WTRU knows the timing of frames on the serving cell, the WTRU only attempts to decode the BSIC on those idle frames on its traffic channel that coincide with the synchronization frame on the BCCH channel, (i.e., frames {103, 337, 623, 857, 1143}). In this way, the decoding of BSIC for SBSA only uses 10% of the idle frames, (i.e., the impact of decoding BSIC for SBSA on the rest of the system is quite small).

Figure 11:
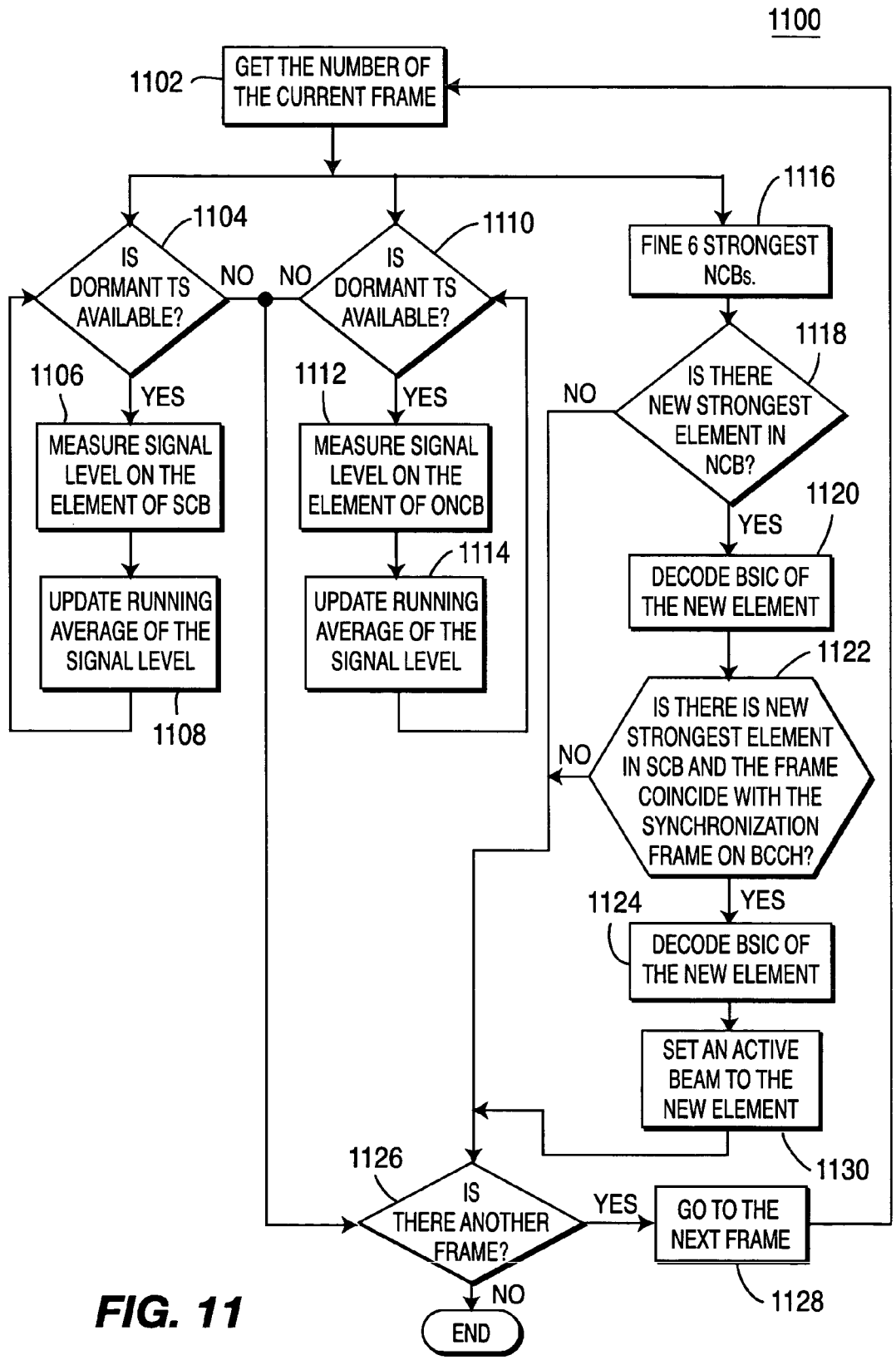
FIGS. 11-14 are flow diagrams of processes for selecting an active beam in accordance with the present invention.

FIG. 11 is a flow diagram of a process 1100 for selecting an active beam in accordance with a first embodiment of the present invention. The WTRU obtains the number of the current frame (step 1102). If the frame belongs to FS, the process 1100 proceeds to step 1104 and signals from the serving cell are measured. If the frame belongs to FN, the process 1100 proceeds to step 1110, and signals from the neighbor cell are measured. If the frame belongs to FB, the process 1100 proceeds to step 1116 and the WTRU decodes the BSIC of the new neighbor cell or the serving cell.

If the frame belongs to FS, and it is determined that there is a dormant time slot at step 1104, the signal level of all elements of SCB is measured (step 1106). Then, the running average of the signal level is updated (step 1108). The process returns to step 1104 to determine whether there is another dormant timeslot available. If there is no dormant time slot available, the process 1100 proceeds to step 1126 to determine whether there is another available frame. If so, go to the next frame and the process 1100 returns to step 1102.

Two of the dormant timeslots in each TDMA frame must be used for stabilizing the local oscillator for transmission and reception of data; hence, these two dormant timeslots are not available for above signal level measurement.

If the frame belongs to FN, and it is determined that there is a dormant time slot at step 1110, signal level of all elements of ONCB is measured (step 1112). Then, the running average of the signal level is updated (step 1114). The process returns to step 1110 to determine whether there is another dormant timeslot available. If there is no dormant time slot available, the process 1100 proceeds to step 1126 to determine whether there is another available frame. If so, go to the next frame and the process 1100 returns to step 1102.

Two of the dormant timeslots in each TDMA frame must be used for stabilizing the local oscillator for transmission and reception of data; hence, these two dormant timeslots are not available for above signal level measurement.

If the frame belongs to FB, elements of NCB having the six highest averaged signal levels are determined (step 1116). If it is determined at step 1118 that there are new elements of NCB in the list of elements having the six highest averaged signal levels, the BSIC of the new elements is decoded at step 1120 starting from the strongest element. In decoding the new elements of NCB, if decoding succeeded on the last trial, or the number of attempts to decode on the current trial has exceeded three times, the next element in ONCB is tried. If the strongest element of SCB is different from the previous one, and if the current frame number (modulo 1326) belongs to the set {103, 337, 623, 857, 1143}, then the BSIC of the new strongest element is decoded (steps 1122, 1124). If the decoding of the BSIC of the new strongest element of SCB succeeded, and the decrementing timer T1 has reached zero, the active beam is set to the new SCB element, and T1 is reset to T1_MAX (step 1130).

In GSM voice, using the SACCH multiframe (which occurs once in every 104 TDMA frames), the WTRU reports to the network the BSICs of the carriers in the neighbor list with the highest six signal levels. In GPRS, the WTRU must report this information to the network anytime the network requests this information.

In a second embodiment for active beam selection, the SBSA procedure repeats every SACCH multiframe (104 TDMA frames). The WTRU measures signal strength on all three beams both for the serving cell and for the neighbor cells, but is not required to decode the BSIC on the strongest active beam prior to switching.

Figure 12:
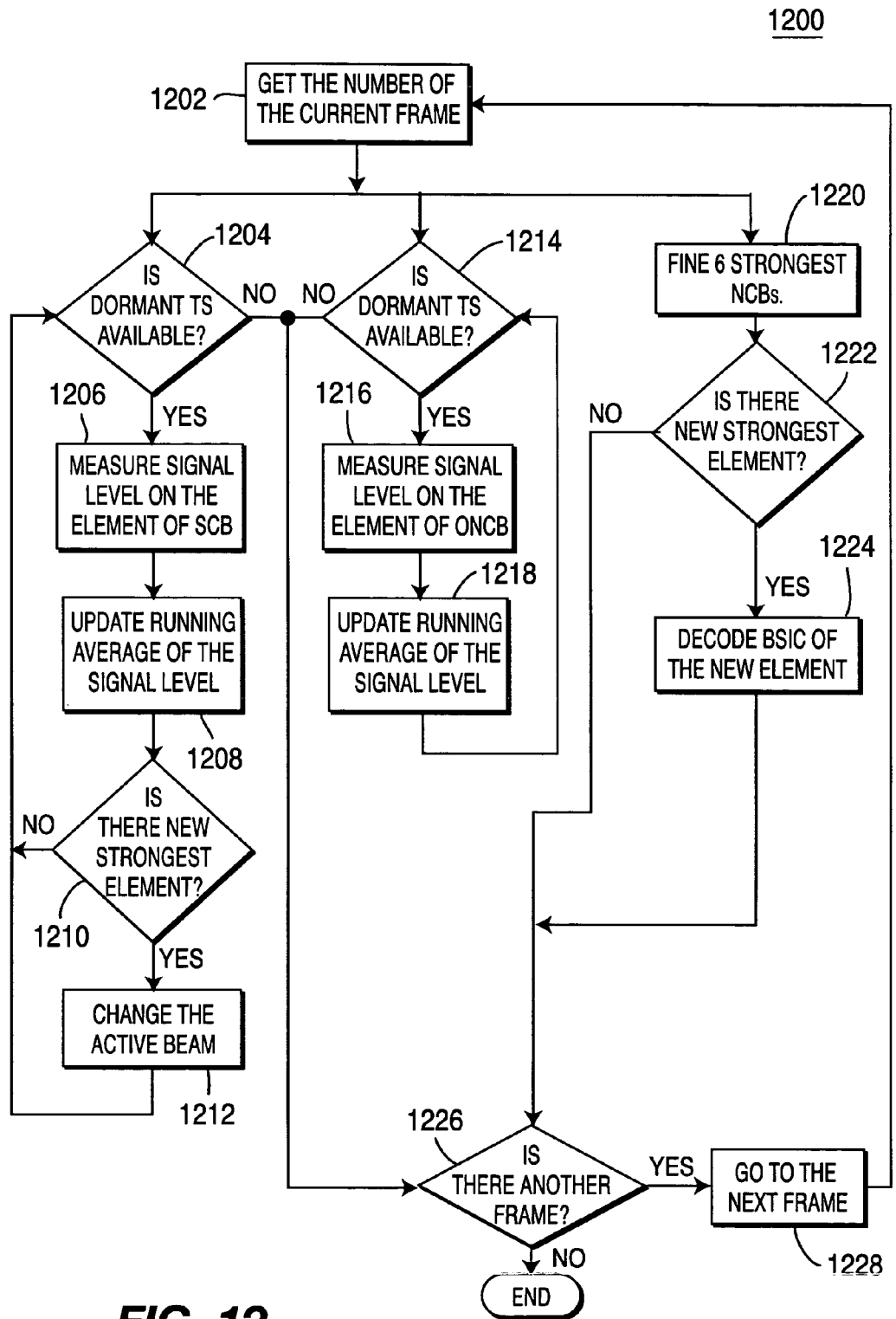

FIG. 12 is a flow diagram of a process 1200 for selecting an active beam in accordance with a second embodiment. The WTRU obtains the number of the current frame (step 1202). If the frame belongs to FS, the process 1200 proceeds to step 1204 and signals from the serving cell are measured. If the frame belongs to FN, the process 1200 proceeds to step 1214, and signals from the neighbor cell are measured. If the frame belongs to FB, the process 1200 proceeds to step 1220 and the WTRU decodes the BSIC of new neighbor cell or the serving cell.

If the frame belongs to FS, and it is determined that there is a dormant time slot at step 1204, the signal level of all elements of SCB is measured (step 1206). Then, the running average of the signal level is updated (step 1208). If a new strongest element of SCB is found in step 1210, and timer T1 is zero, the active beam is set to this strongest element of SCB, and the decrementing timer T1 is reset to T1_MAX (step 1212). The process returns to step 1204 to determine whether there is another dormant timeslot available. If there is no dormant time slot available, the process 1200 proceeds to step 1226 to determine whether there is another available frame. If so, go to the next frame (step 1228) and the process 1200 returns to step 1202.

Two of the dormant timeslots in each TDMA frame must be used for stabilizing the local oscillator for transmission and reception of data. Hence, these two dormant timeslots are not available for above signal level measurement.

If the frame belongs to FN, and it is determined that there is a dormant time slot at step 1214, the signal level of all elements of ONCB is measured (step 1216). Then, the running average of the signal level is updated (step 1218). The process returns to step 1214 to determine whether there is another dormant timeslot available. If there is no dormant time slot available, the process 1200 proceeds to step 1226 to determine whether there is another available frame. If so, go to the next frame (step 1228) and the process 1200 proceeds to step 1202.

Two of the dormant timeslots in each TDMA frame must be used for stabilizing the local oscillator for transmission and reception of data. Hence, these two dormant timeslots are not available for above signal level measurement.

If the frame belongs to FB, elements of NCB having the six highest averaged signals levels are determined (step 1220). If it is determined at step 1222 that there are new elements of NCB in the list of elements having the six highest averaged signal levels, the BSIC of the new elements is decoded at step 1224 starting from the strongest element. In decoding the new elements of NCB, if decoding succeeded on the last trial, or the number of attempts to decode on the current trial has exceeded three times, the next element in ONCB is tried.

In GSM voice, using the SACCH multiframe (which occurs once in every 104 TDMA frames), the WTRU reports to the network the BSICs of the carriers in the neighbor list with the highest six signal levels. In GPRS, the WTRU must report this information to the network anytime the network requests this information.

In a third embodiment for active beam selection, the WTRU measures signal strength on all three beams for the serving cell and on the omni-directional beam for the neighbor cells. The WTRU is required to successfully decode the BSIC on the new candidate active beam before the active beam is changed. Since the WTRU knows the timing of frames on the serving cell, the WTRU only attempts to decode the BSIC on those idle frames on its traffic channel that coincide with the synchronization frame on the BCCH channel (i.e., frames {103, 337, 623, 857, 1143}. In this way, the decoding of BSIC for SBSA uses only 10% of the idle frames (i.e., the impact of decoding BSIC for SBSA on the rest of the system is quite small).

Figure 13:
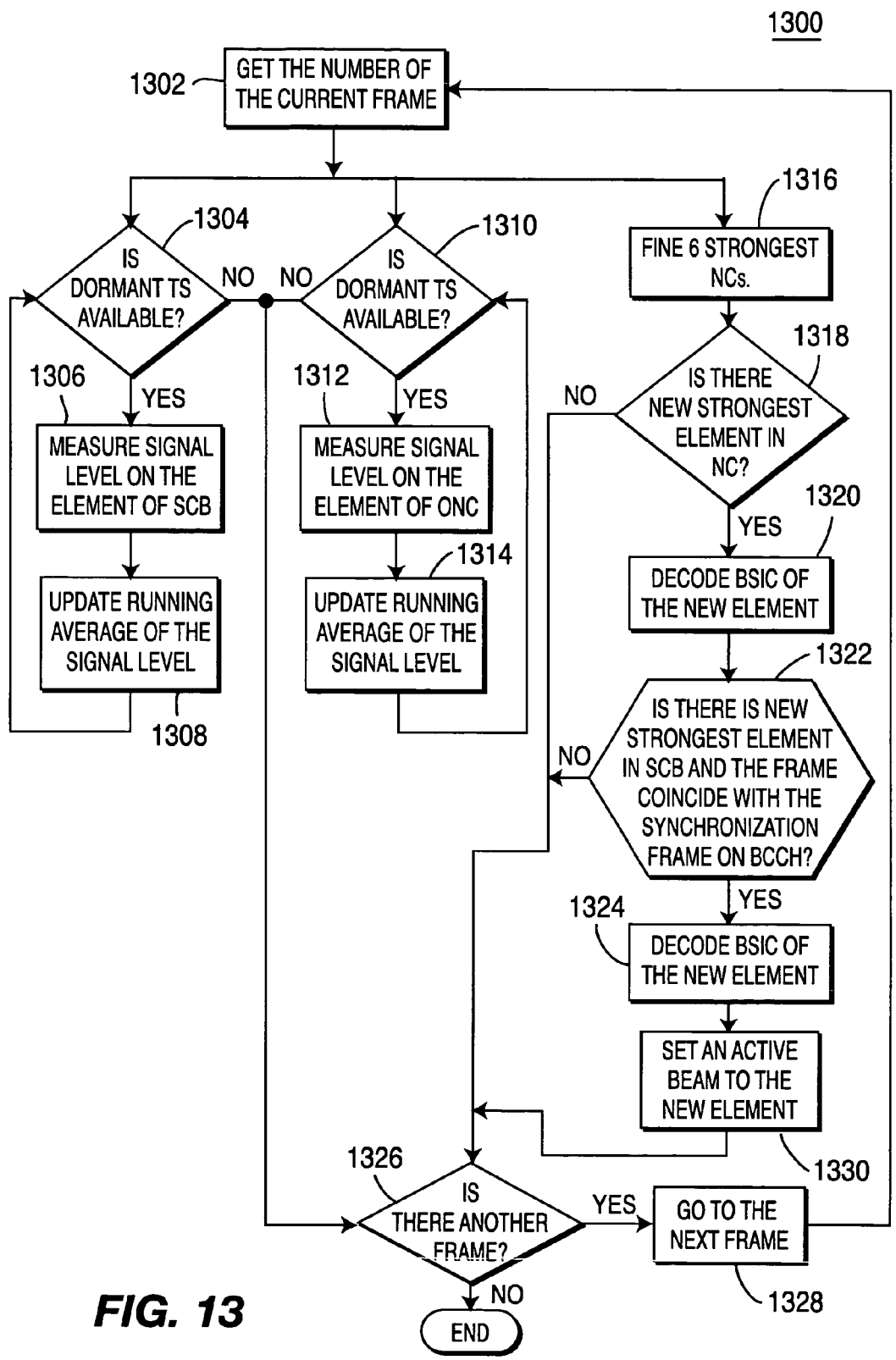

FIG. 13 is a flow diagram of a process 1300 for selecting an active beam in accordance with a third embodiment. The WTRU obtains the number of the current frame (step 1302). If the frame belongs to FS, the process 1300 proceeds to step 1304 and signals from the serving cell are measured. If the frame belongs to FN, the process 1300 proceeds to step 1310, and signals from the neighbor cell are measured. If the frame belongs to FB, the process 1300 proceeds to step 1316 and the WTRU decodes the BSIC of the new neighbor cell or the serving cell.

If the frame belongs to FS, and it is determined that there is a dormant time slot at step 1304, the signal level of all elements of SCB is measured (step 1306). Then, the running average of the signal level is updated (step 1308). The process returns to step 1304 to determine whether there is another dormant timeslot available. If there is no dormant time slot available, the process 1300 proceeds to step 1326 to determine whether there is another available frame. If so, go to the next frame (step 1328) and the process 1300 returns to step 1302.

Two of the dormant timeslots in each TDMA frame must be used for stabilizing the local oscillator for transmission and reception of data; hence, these two dormant timeslots are not available for above signal level measurement.

If the frame belongs to FN, and it is determined that there is a dormant time slot at step 1310, the signal level of all elements of ONC is measured (step 1312). Then, the running average of the signal level is updated (step 1314). The process returns to step 1310 to determine whether there is another dormant timeslot available. If there is no dormant time slot available, the process 1300 proceeds to step 1326 to determine whether there is another available frame. If so, go to the next frame (step 1328) and the process 1300 proceeds to step 1302.

Two of the dormant timeslots in each TDMA frame must be used for stabilizing the local oscillator for transmission and reception of data; hence, these two dormant timeslots are not available for above signal level measurement.

If the frame belongs to FB, elements of NC having the six highest averaged signal levels are determined (step 1316). If it is determined at step 1318 that there are new elements of NC in the list of elements having the six highest averaged signal levels, the BSIC of the new elements is decoded at step 1320 starting from the strongest element. In decoding the new elements of NCB, if decoding succeeded on the last trial, or the number of attempts to decode on the current trial has exceeded three times, the next element in ONC is tried. If the strongest element of SCB is different from the previous one, and if the current frame number (modulo 1326) belongs to the set {103, 337, 623, 857, 1143}, then the BSIC of the new strongest element is decoded (steps 1322, 1324). If the decoding of BSIC of new strongest element of SCB succeeded, and the decrementing timer T1 has reached zero, the active beam is set to the new SCB element, and T1 is reset to T1_MAX (step 1330).

In a fourth embodiment for active beam selection, the SBSA procedure repeats every SACCH multiframe (104 TDMA frames). The WTRU measures signal strength on all three beams for the serving cell and on omni-directional beam for the neighbor cell, but is not required to decode the BSIC on the strongest active beam prior to switching.

Figure 14:
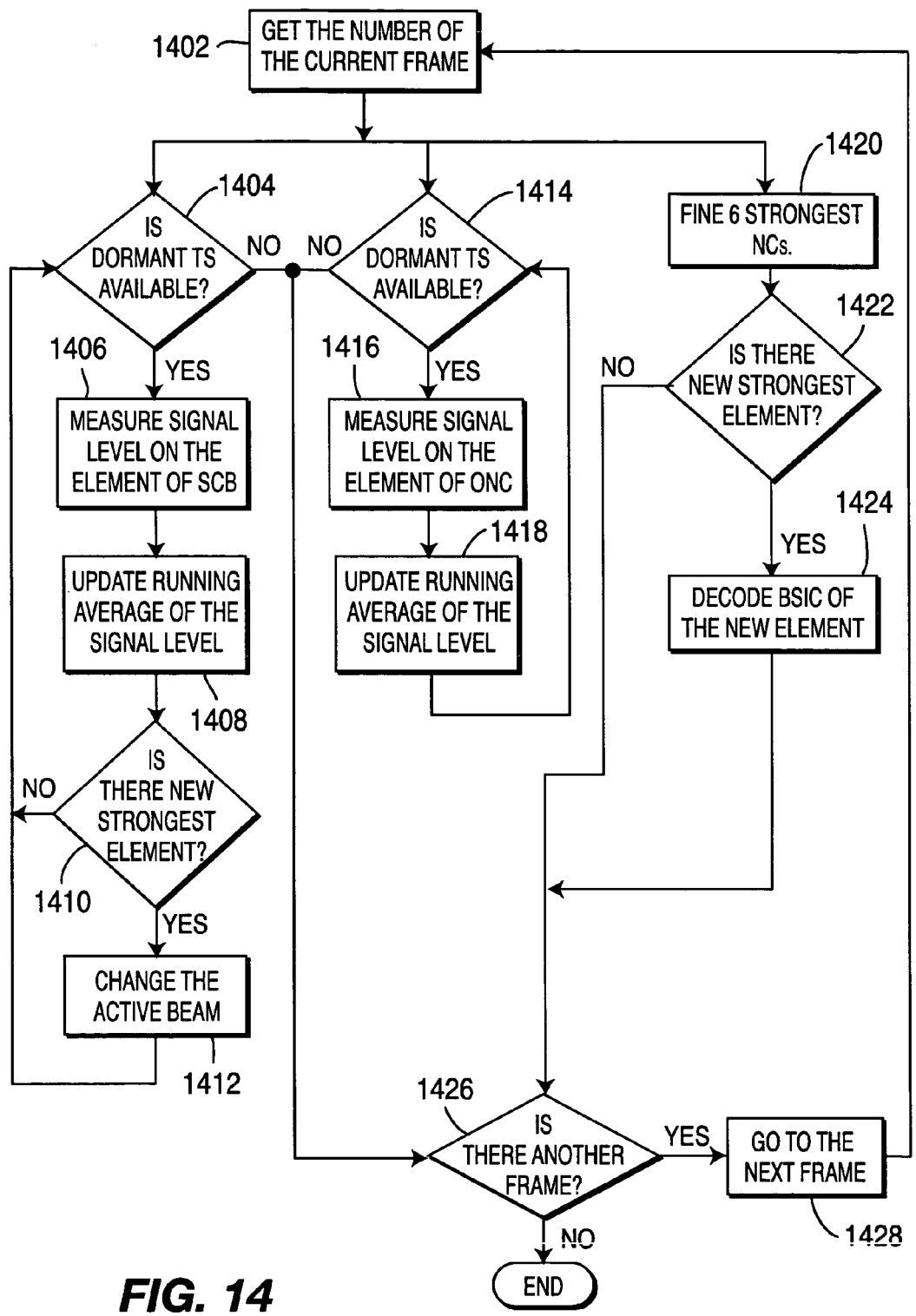
Figure 11:
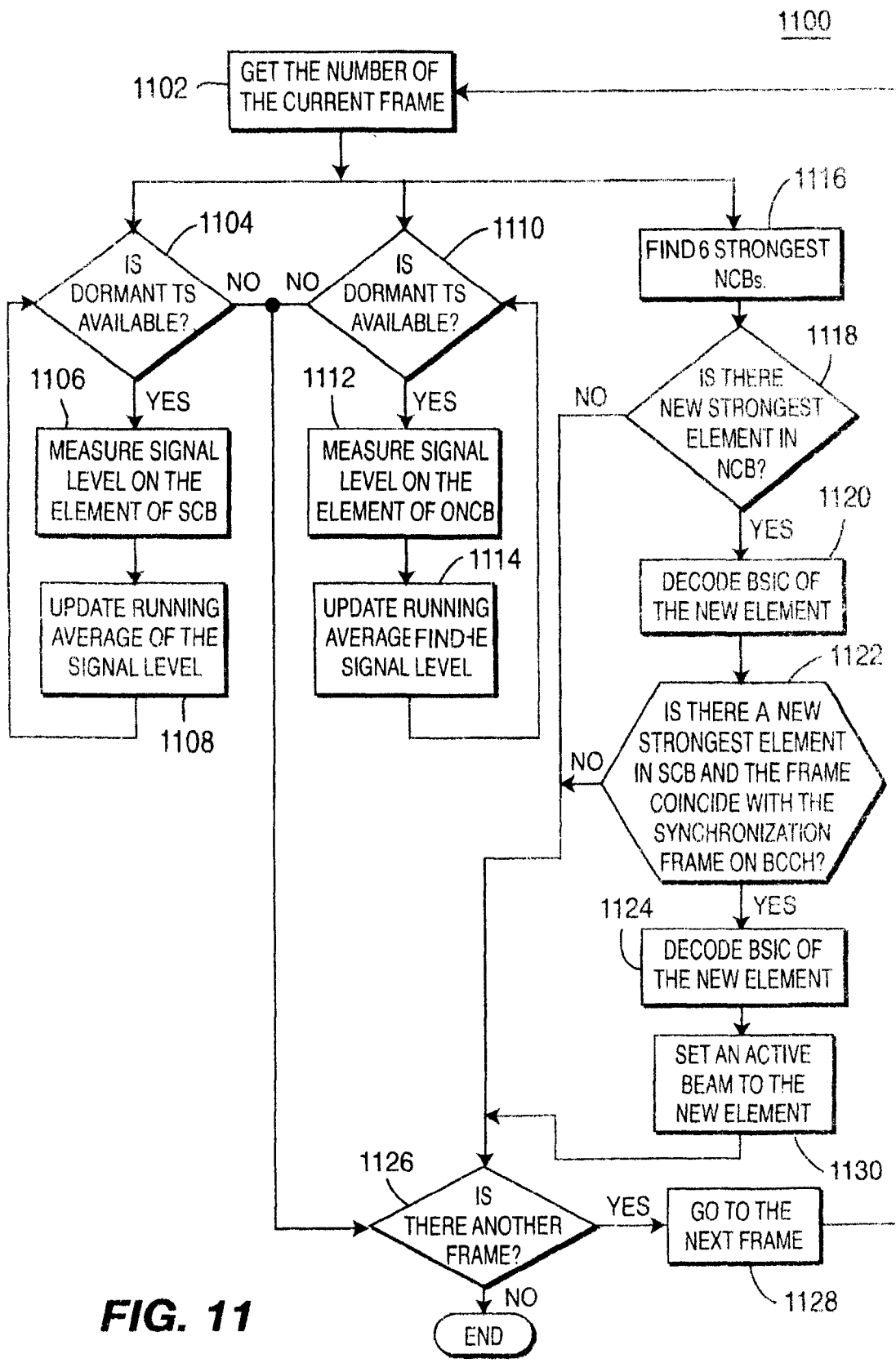
Figure 12:
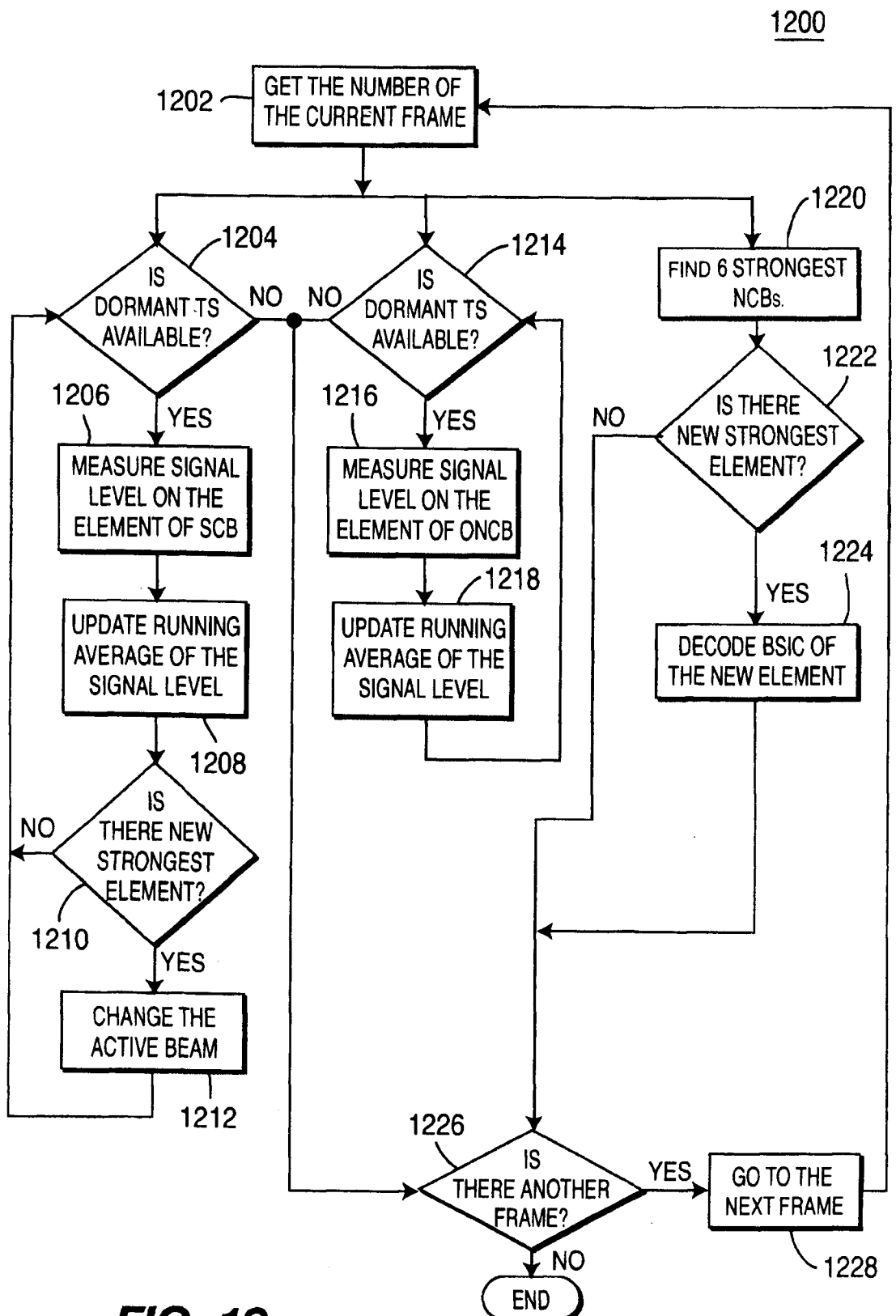
Figure 13:
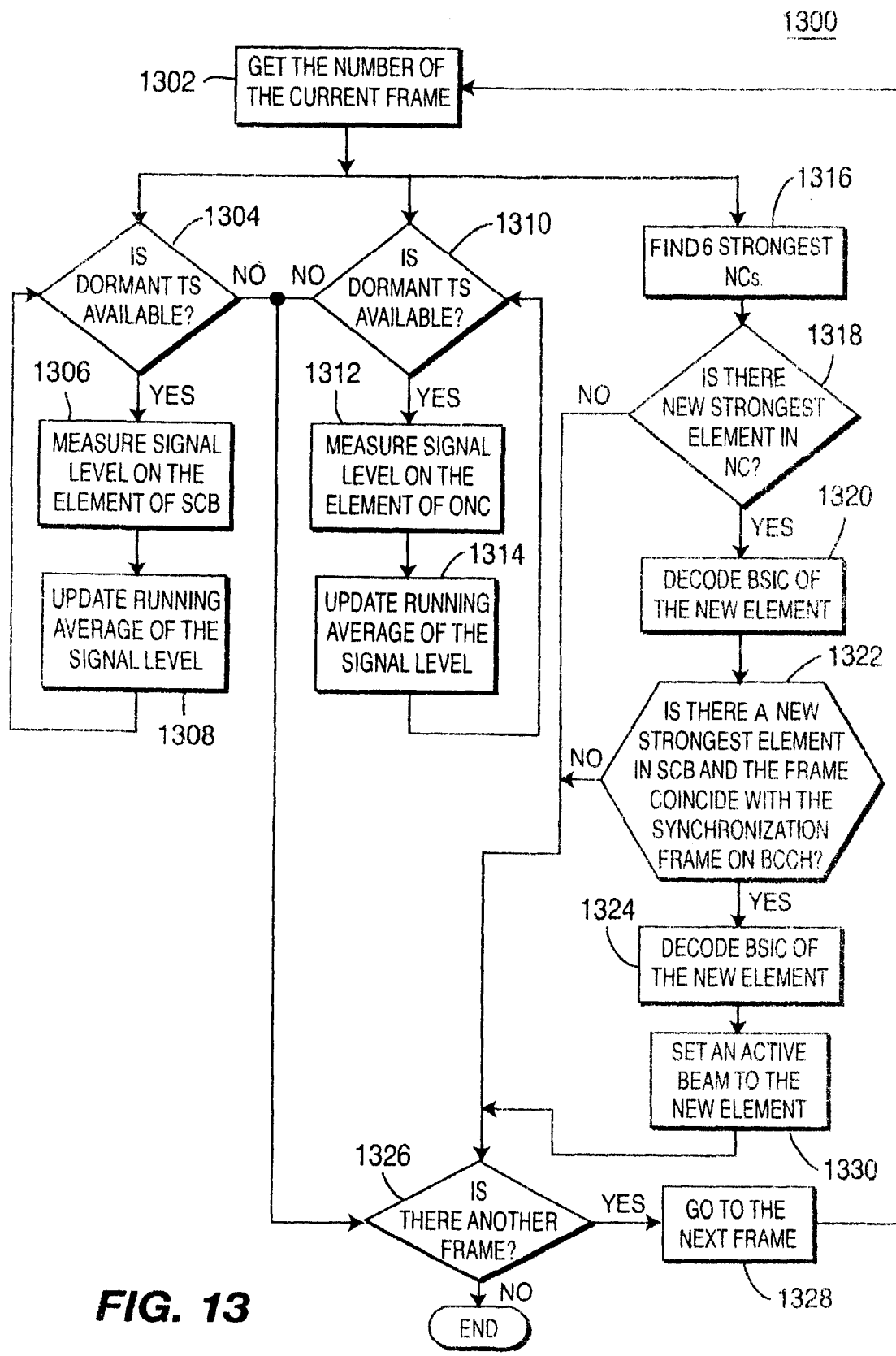
Figure 14:
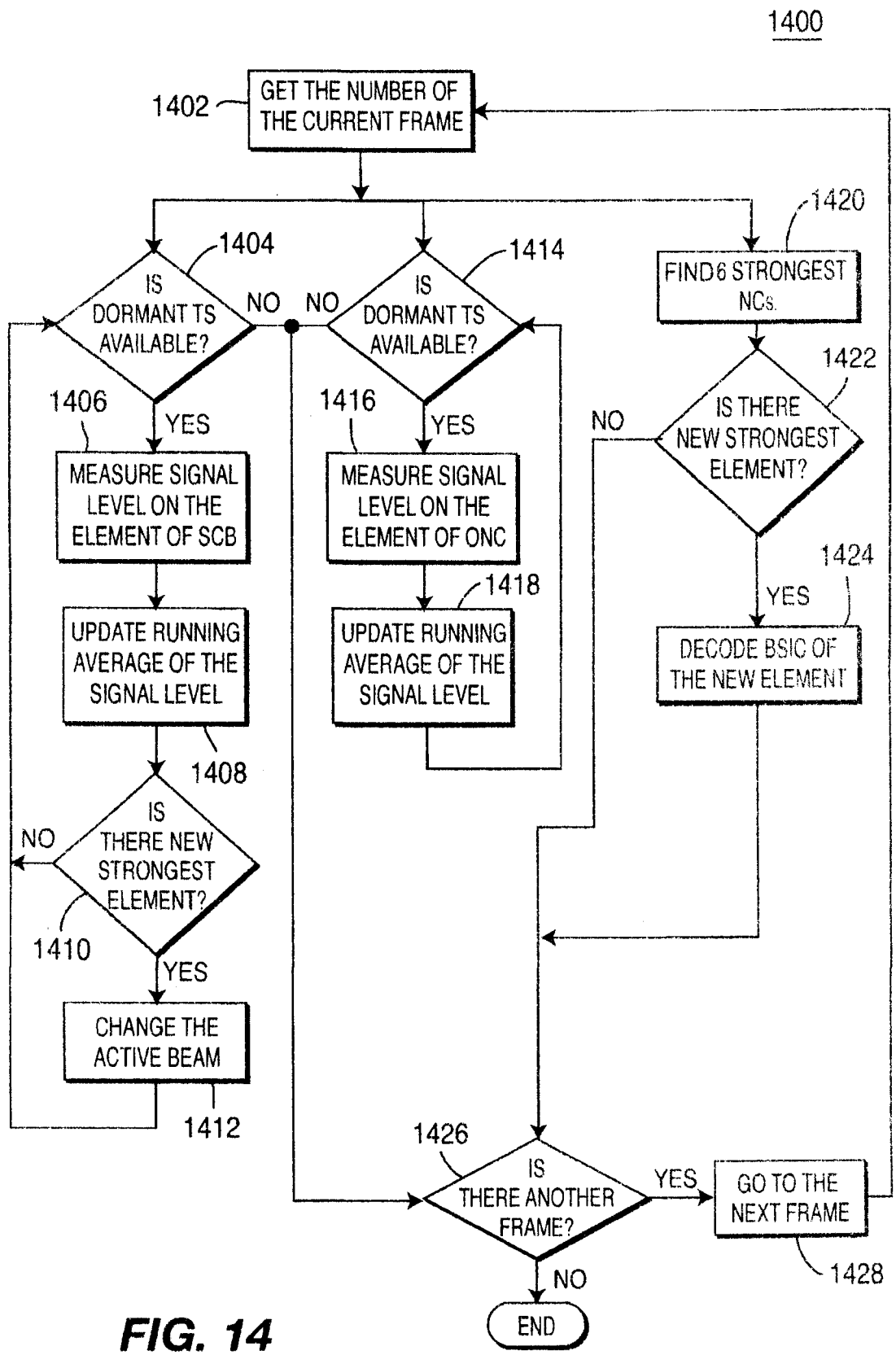
Figure 11:
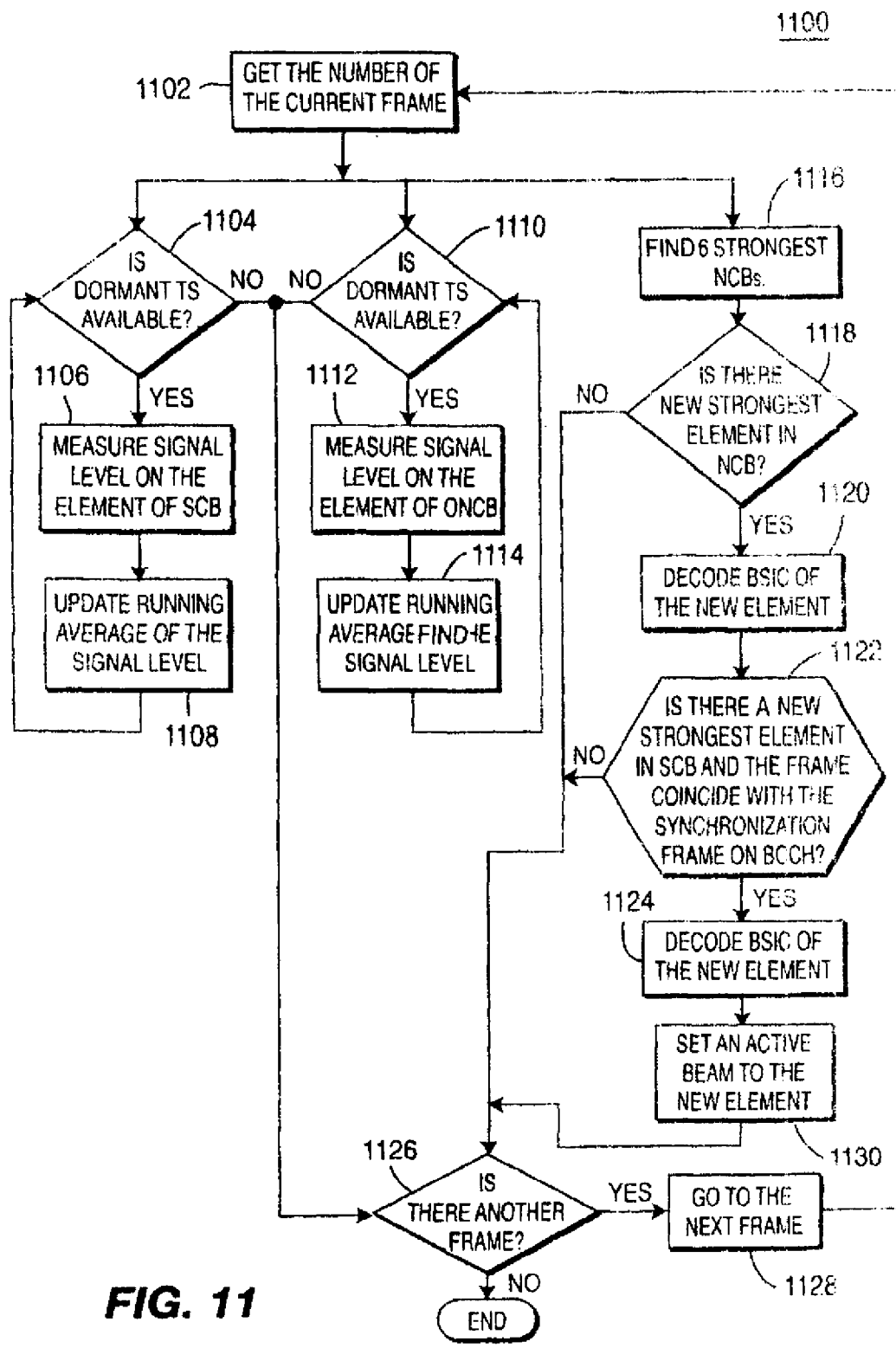
Figure 12:
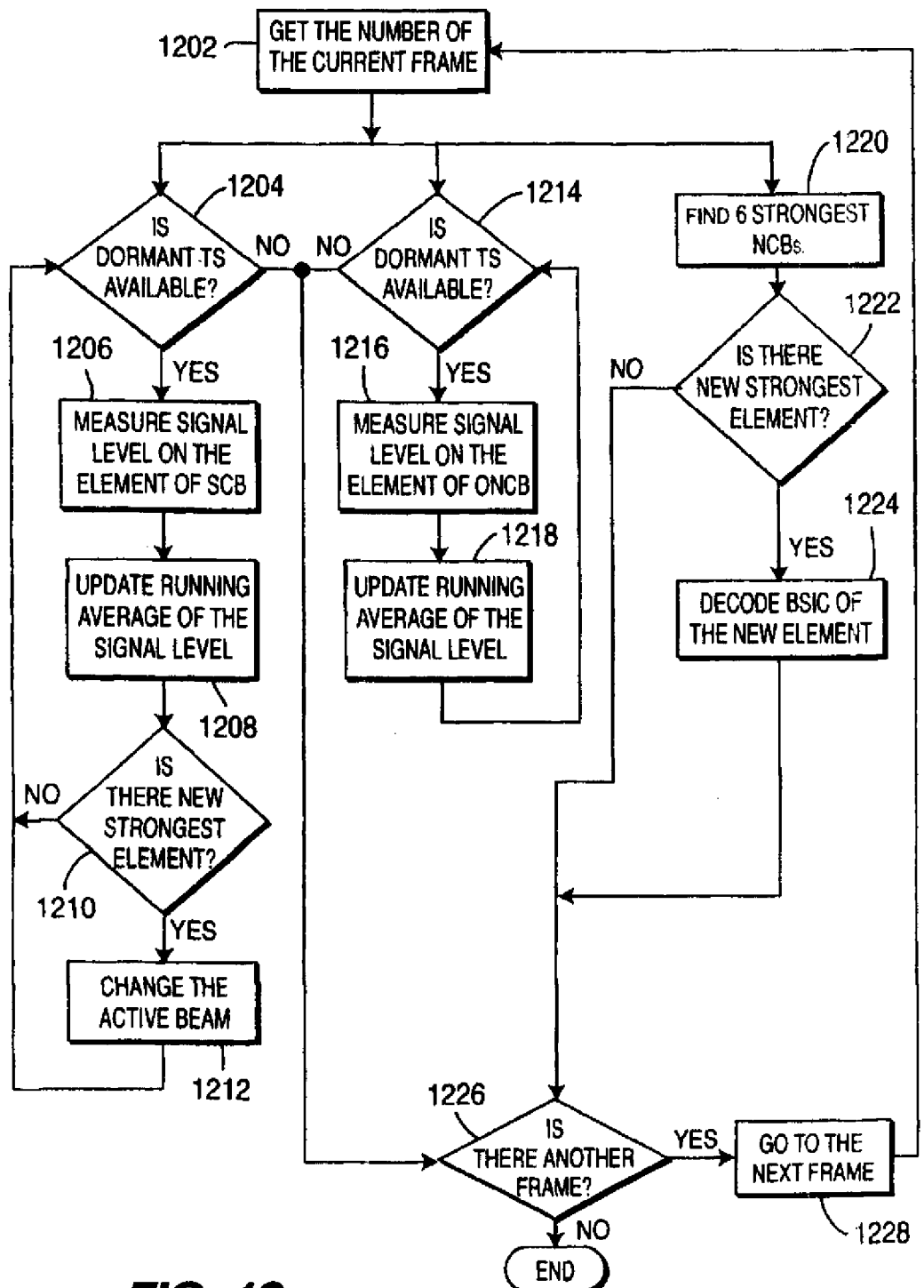
Figure 13:
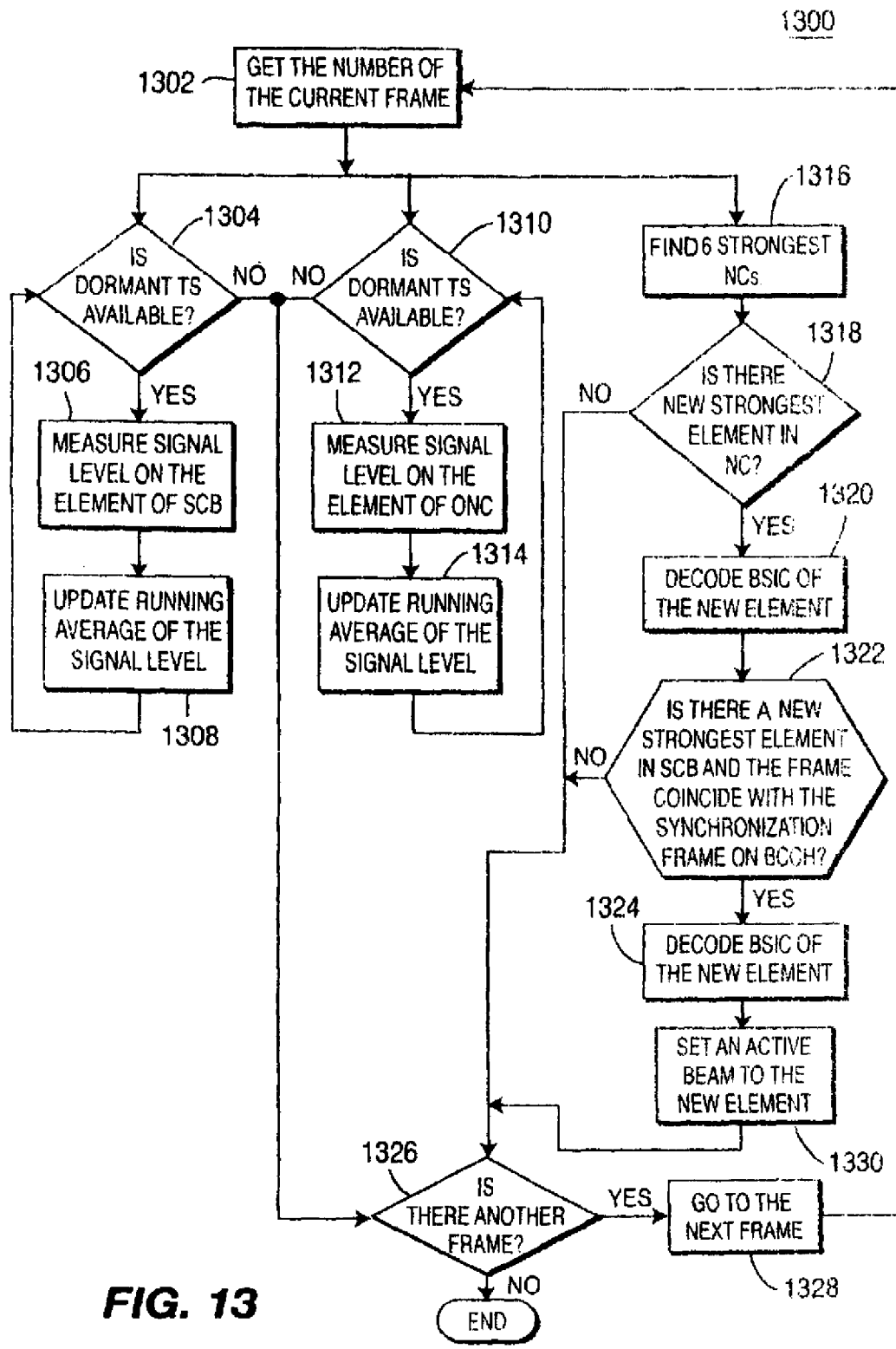
Figure 14:
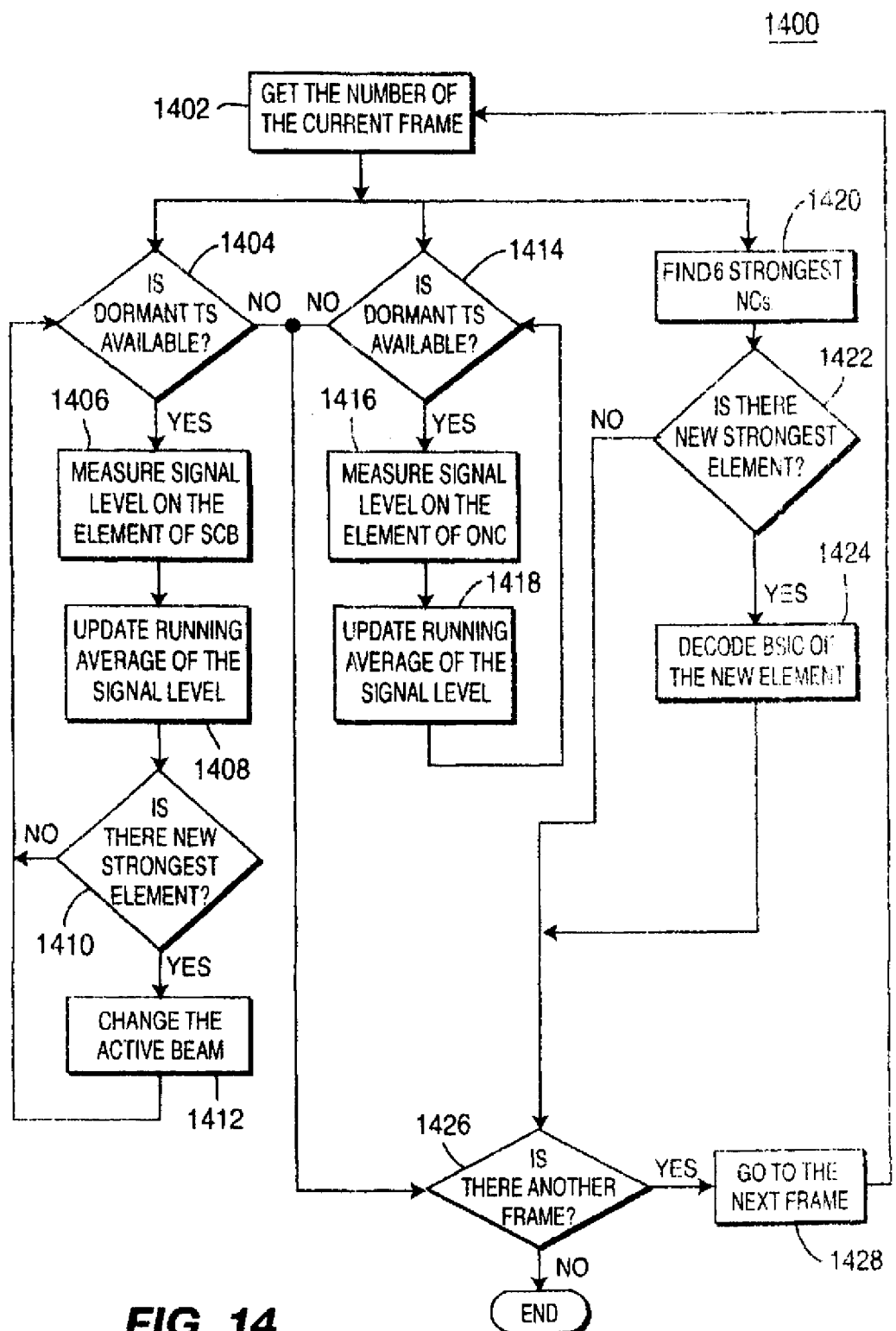

FIG. 14 is a flow diagram of a process 1400 for selecting an active beam in accordance with a fourth embodiment. The WTRU obtains the number of the current frame (step 1402). If the frame belongs to FS, the process 1400 proceeds to step 1404 and signals from the serving cell are measured. If the frame belongs to FN, the process 1400 proceeds to step 1414, and signals from the neighbor cell are measured. If the frame belongs to FB, the process 1400 proceeds to step 1420 and the WTRU decodes the BSIC of the new neighbor cell or the serving cell.

If the frame belongs to FS, and it is determined that there is a dormant time slot at step 1404, the signal level of all elements of SCB is measured (step 1406). Then, the running average of the signal level is updated (step 1408). If a new strongest element of SCB is found in step 1410, and timer T1 is zero, the active beam is set to this strongest element of SCB, and the decrementing timer T1 is reset to T1_MAX (step 1412). The process returns to step 1404 to determine whether there is another dormant timeslot available. If there is no dormant time slot available, the process 1400 proceeds to step 1426 to determine whether there is another available frame. If so, go to the next frame (step 1428) and the process proceeds to step 1402.

If the frame belongs to FN, and it is determined that there is a dormant time slot at step 1414, the signal level of all elements of ONC is measured (step 1416). Then, the running average of the signal level is updated (step 1418). The process returns to step 1404 to determine whether there is another dormant timeslot available. If there is no dormant time slot available, the process 1400 proceeds to step 1426 to determine whether there is another available frame. If so, go to the next frame (step 1428) and the process 1400 proceeds to step 1402.

If the frame belongs to FB, elements of NCB having the six highest averaged signal level are determined (step 1420). If it is determined at step 1422 that there are new elements of NC in the list of elements having the six highest averaged signal levels, the BSIC of the new elements is decoded at step 1424 starting from the strongest element. In decoding the new elements of NC, if decoding succeeded on the last trial, or the number of attempts to decode on the current trial has exceeded three times, the next element in ONC is tried (not shown in FIG. 14).

In GSM voice, during the SACCH frame the WTRU reports to the network the BSICs of the carriers in the neighbor list with the highest six signal levels. In GPRS, the WTRU must report this information to the network anytime the network requests this information.

As a summary, features of the foregoing four embodiments are provided in

TABLE 1

Features of SBSA Procedures

| | Measure all beams for neighbor cells | Decode BSIC for active beam |
|---|---|---|
| Procedure 1 | Yes | Yes |
| Procedure 2 | Yes | NO |
| Procedure 3 | NO | YES |
| Procedure 4 | NO | NO |

During each FS frame, the WTRU attempts to decode the BSIC on the BCCH carrier of the serving cell. Since the BSIC is only transmitted in small subset of the time slots on the BCCH carrier of the serving cell, and since the WTRU knows when these timeslots carrying the BSIC occur on the BCCH carrier of the serving cell, it is advantageous to schedule FS frames so that each FS frame coincides with those frames carrying a BSIC on the BCCH of the serving cell.

A similar approach can be applied to scheduling of FN frames, if the WTRU knows when frames carrying BSIC on the BCCH carrier of the neighboring cell occur. In a GSM/GPRS network, each WTRU always synchronizes itself to the timing of its serving cell. Hence, the WTRU always knows when the frames carrying BSIC will occur on the BCCH carrier of its serving cell. However, a GSM/GPRS WTRU is typically not synchronized to the neighboring cells (and different cells in GSM/GPRS are not synchronized together). Hence, acquiring timing of neighboring cells is an extra step for the WTRU.

In accordance with the present invention, data reception on the traffic channel is not affected by implementation of SBSA. The measurements for SBSA beam selection are performed during the idle frames and dormant timeslots. The most important choice to make is whether to measure the signal strength on all three beams for the carriers in the neighbor list or to just measure the signal strength on the omni-directional beam for the carriers in the neighbor list.

The ratio (denoted by R) of the number of elements in the set FN divided by the number of elements in set FS can be used to tradeoff measurements on the serving cell against measurements on the neighbor cells.

While this invention has been particularly shown and described with reference to preferred embodiments, it will be understood by those skilled in the art that various changes in form and details may be made therein without departing from the scope of the invention described hereinabove.

What is claimed is:

1. A method for utilizing a directional beam antenna in a wireless transmit/receive unit (WTRU), comprising:
  (a) the WTRU registering with a wireless communication system including a serving cell and at least one neighbor cell;
  (b) the WTRU measuring quality of the signals received from the serving cell with a plurality of directional beams while steering the directional beam antenna;
  (c) selecting a particular one of the directional beams having the best signal quality as an active beam;
  (d) determining whether quality of signal from the serving cell via the active beam is below a predetermined threshold; and
  (e) if the quality of signal from the serving cell on the active beam is below the predetermined threshold, repeating steps (b)-(d) to switch the active beam to a beam having the best signal quality, and if the quality of signal from the serving cell on the active beam is not below the predetermined threshold, proceeding to step (d) after a predetermined time interval without switching the active beam.

2. The method of claim 1 wherein the signal quality is measured in terms of at least one of a received signal strength indicator and a carrier-to-interference ratio.

3. The method of claim 1 wherein the quality of signals is measured in a dormant time slot.

4. The method of claim 1 wherein the WTRU receives signals from the serving cell in a different frame than the WTRU receives signals from the neighbor cell.

5. The method of claim 4 wherein the frame for receiving signals from the serving cell is determined to be same as the frames carrying a base station identity code on a broadcast control channel of the serving cell.

6. The method of claim 5 wherein the WTRU further obtains synchronization with the neighbor cell, whereby the frame for receiving signals from the neighbor cell is determined to be same as the frames carrying a base station identity code on a broadcast control channel of the neighbor cell.

7. The method of claim 4 wherein the WTRU decodes a base station identity code before changing the active beam.

8. The method of claim 4 wherein the WTRU does not decode a base station identity code before changing the active beam.

9. The method of claim 4 wherein the WTRU receives signals from the neighbor cell using an omni-directional beam.

10. The method of claim 1 wherein the signal quality is measured with messages transmitted from the serving cell via one of a pilot channel, a broadcast channel and a traffic channel.

11. The method of claim 1 wherein the quality of signals received from two different directions are compared with a midamble containing a data sequence, such that the quality of signals received from one direction is measured using a first half of the midamble and the quality of signals received from the other direction is measured using a second half of the midamble.

12. The method of claim 1 wherein one time slot is divided into a plurality of parts, and the quality of signals for each direction is measured in a different part of the time slot.

13. The method of claim 1 wherein the selection of the best directional beam is based on the average of some number of signal quality measurements made for each directional beam.

14. The method of claim 1 wherein the selection of the best directional beam is based on the differences between signal quality measurements made for each directional beam.

15. A wireless transmit/receive unit (WTRU) comprising:
a switched beam directional antenna for generating a directional beam;
a receiver/transmitter, electrically coupled to the switched beam directional antenna, for receiving and transmitting signals;
a baseband processor, electrically coupled to the receiver/transmitter, for processing signals received by the receiver/transmitter;
a beam steering unit, electrically coupled to the switched beam directional antenna, for steering the directional beam to one of a plurality of directions; and
a controller, electrically coupled to the beam steering unit, the receiver/transmitter, and the baseband processor, the controller for steering the directional beam as an active beam in a direction having the best quality of signals, and periodically comparing the signal quality from the serving cell to a predetermined threshold and switching the active beam to a beam having the best signal quality when the signal quality from the serving cell is below the predetermined threshold.

16. The WTRU of claim 15 wherein the signal quality is measured in terms of at least one of a received signal strength indicator and a carrier-to-interference ratio.

17. The WTRU of claim 15 wherein the quality of signals is measured in a dormant time slot.

18. The WTRU of claim 15 wherein the WTRU receives signals from the serving cell in a different frame than the WTRU receives signals from the neighbor cell.

19. The WTRU of claim 18 wherein the frame for receiving signals from the serving cell is determined to be same as the frames carrying a base station identity code on a broadcast control channel of the serving cell.

20. The WTRU of claim 19 wherein the WTRU further obtains synchronization with the neighbor cell, whereby the frame for receiving signals from the neighbor cell is determined to be same as the frames carrying a base station identity code on a broadcast control channel of the neighbor cell.

21. The WTRU of claim 18 wherein the WTRU decodes a base station identity code before changing the active beam.

22. The WTRU of claim 20 wherein the WTRU does not decode a base station identity code before changing the active beam.

23. The WTRU of claim 18 wherein the WTRU receives signals from the neighbor cell using an omni-directional beam.

24. The WTRU of claim 15 wherein the signal quality is measured with messages transmitted from the serving cell via one of a pilot channel, a broadcast channel and a traffic channel.

25. The WTRU of claim 15 wherein the quality of signals received from two different directions are compared with a midamble containing a data sequence, such that the quality of signals received from one direction is measured using a first half of the midamble and the quality of signals received from the other direction is measured using a second half of the midamble.

26. The WTRU of claim 15 wherein one time slot is divided into a plurality of parts, and the quality of signals for each direction is measured in a different part of the time slot.

27. The WTRU of claim 15 wherein the selection of the directional beam is based on the average of some number of signal quality measurements made for each directional beam.

28. The WTRU of claim 15 wherein the selection of the directional beam is based on the differences between signal quality measurements made for each directional beam.

29. An integrated circuit (IC) for use with an antenna array which generates a directional beam, the IC comprising:
a receiver/transmitter, electrically coupled to a switched beam directional antenna, for processing signals received and transmitted by the switched beam directional antenna;
a baseband processor, electrically coupled to the receiver/transmitter, for measuring the quality of the signals received by the switched beam directional antenna;
a beam steering unit, electrically coupled to the switched beam directional antenna, for steering the directional beam to one of a plurality of directions; and
a controller, electrically coupled to the receive/transmitter, the beam steering unit and the baseband processor, the controller for steering the directional beam as an active beam in a direction having the best quality of signal, and periodically comparing the signal quality from the serving cell to a predetermined threshold and switching the active beam to a beam having the best signal quality when the signal quality from the serving cell is below the predetermined threshold.

* * * * *

UNITED STATES PATENT AND TRADEMARK OFFICE
CERTIFICATE OF CORRECTION

| | | |
|---|---|---|
| PATENT NO. | : 7,460,834 B2 | Page 1 of 5 |
| APPLICATION NO. | : 10/997618 | |
| DATED | : December 2, 2008 | |
| INVENTOR(S) | : Johnson et al. | |

It is certified that error appears in the above-identified patent and that said Letters Patent is hereby corrected as shown below:

ON THE TITLE PAGE

At section (56), FOREIGN PATENT DOCUMENTS, page 1, right column, after line beginning with "EP 1 069 706" delete "EP 1096706 1/2001".

The sheets of drawings, consisting of figures 11-14, should be deleted to appear as per attached figures 11-14.

Signed and Sealed this

Thirteenth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,460,834 B2 | |
| APPLICATION NO. | : 10/997618 | |
| DATED | : December 2, 2008 | |
| INVENTOR(S) | : Johnson et al. | |

It is certified that error appears in the above-identified patent and that said Letters Patent is hereby corrected as shown below:

ON THE TITLE PAGE

At section (56), FOREIGN PATENT DOCUMENTS, page 1, right column, after line beginning with "EP 1 069 706" delete "EP 1096706 1/2001".

The sheets of drawings, consisting of figures 11-14, should be deleted to appear as per attached figures 11-14.

IN THE SPECIFICATION

At column 4, line 45, after the word "directional" delete "beams" and insert therefore --beam--.

At column 6, line 27, after the word "average" delete "period–(195.7–150–577*10%+34.2)" and insert therefore --period=(195.7–150–577*10%+34.2)--.

IN THE CLAIMS

At claim 15, column 13, line 42, after the words "quality of" delete "signals" and insert therefore --signal--.

This certificate supersedes the Certificate of Correction issued September 13, 2011.

Signed and Sealed this
Fourteenth Day of February, 2012

David J. Kappos
*Director of the United States Patent and Trademark Office*